(12) United States Patent
Jacob

(10) Patent No.: US 8,365,822 B2
(45) Date of Patent: Feb. 5, 2013

(54) INTERLEAVED ARM SYSTEM FOR LOGGING A WELLBORE AND METHOD FOR USING SAME

(75) Inventor: Gregoire Jacob, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 339 days.

(21) Appl. No.: 12/871,601

(22) Filed: Aug. 30, 2010

(65) Prior Publication Data

US 2011/0048702 A1    Mar. 3, 2011

Related U.S. Application Data

(63) Continuation-in-part of application No. 12/871,566, filed on Aug. 30, 2010.

(30) Foreign Application Priority Data

Aug. 31, 2009    (EP) ..................................... 09290658

(51) Int. Cl.
*E21B 47/01*    (2012.01)
*E21B 49/10*    (2006.01)

(52) U.S. Cl. ...................... 166/254.2; 166/66; 73/152.17

(58) Field of Classification Search ............. 166/250.01, 166/250.11, 254.2, 66; 702/6; 175/50; 73/152.54, 73/152.02, 152.17; 33/1 H
See application file for complete search history.

(56) References Cited

U.S. PATENT DOCUMENTS

| | | | | |
|---|---|---|---|---|
| 2,843,459 A | * | 7/1958 | Meiklejohn | ..................... 422/50 |
| 3,167,707 A | * | 1/1965 | Oliver | ........................... 324/347 |
| 3,423,671 A | * | 1/1969 | Vezin | ............................ 324/347 |
| 3,685,158 A | * | 8/1972 | Planche | ........................ 33/544.3 |
| 4,614,250 A | | 9/1986 | Panetta et al. | |
| 4,757,873 A | * | 7/1988 | Linyaev et al. | ................ 181/105 |
| 4,857,831 A | * | 8/1989 | Davies et al. | .................. 324/357 |
| 4,862,090 A | * | 8/1989 | Vannier et al. | ................. 324/367 |
| 4,926,937 A | | 5/1990 | Hademenos | |
| 4,979,585 A | | 12/1990 | Chesnutt | |
| 5,022,484 A | | 6/1991 | Panetta et al. | |
| 5,092,056 A | | 3/1992 | Deaton | |
| 5,947,213 A | | 9/1999 | Angle | |
| 6,112,809 A | | 9/2000 | Angle | |
| 6,702,010 B2 | | 3/2004 | Yuratich et al. | |
| 6,815,954 B2 | | 11/2004 | Iwanicki et al. | |

(Continued)

FOREIGN PATENT DOCUMENTS

| | | |
|---|---|---|
| EP | 0911483 | 4/1999 |
| EP | 1281834 | 2/2003 |

(Continued)

*Primary Examiner* — Kenneth L Thompson
(74) *Attorney, Agent, or Firm* — Stephanie Chi; Marcin Rzaniak

(57) ABSTRACT

A logging tool, system and method for logging a wellbore are presented. The logging tool preferably includes at least two arm sets that are positionable on a downhole tool deployable into the wellbore. The two arm sets preferably include a first arm set, a second arm set, and an overlap tool body. The first arm set has at least two azimuthally spaced first arm systems with a sensor pad coupled to two arms. The two arms have an upper connection and a lower connection on a tool body of the downhole tool. The second arm set has at least two azimuthally spaced second arm systems with a sensor pad coupled to two arms. The two arms have an upper connection and a lower connection on the tool body, and wherein the upper connection of the second arm set are longitudinally overlapped between the lower connections of the first arm set. The overlap tool body portion for coupling the upper connection of the second arm set and the lower connections of the first arm set to the downhole tool.

17 Claims, 22 Drawing Sheets

| U.S. PATENT DOCUMENTS | | | |
|---|---|---|---|
| 7,069,775 B2 | 7/2006 | Fredette et al. | |
| 7,121,364 B2 | 10/2006 | Mock et al. | |
| 7,131,210 B2 | 11/2006 | Fredette et al. | |
| 7,784,368 B2 * | 8/2010 | Gibson et al. | 73/865.8 |
| 8,156,799 B2 * | 4/2012 | Maute et al. | 73/152.01 |
| 2006/0230846 A1 * | 10/2006 | Smith et al. | 73/866.5 |
| 2009/0229820 A1 * | 9/2009 | Saeed | 166/250.15 |
| 2011/0048801 A1 * | 3/2011 | Jacob | 175/45 |
| 2012/0055711 A1 * | 3/2012 | Brannigan et al. | 175/50 |

| FOREIGN PATENT DOCUMENTS | | |
|---|---|---|
| GB | 2459368 | 10/2009 |
| WO | 9521987 | 8/1995 |
| WO | WO 95/21987 | 8/1995 |
| WO | 0237052 | 5/2002 |
| WO | WO 02/37052 | 5/2002 |
| WO | 02070943 | 9/2002 |
| WO | WO 02/070943 | 9/2002 |

* cited by examiner

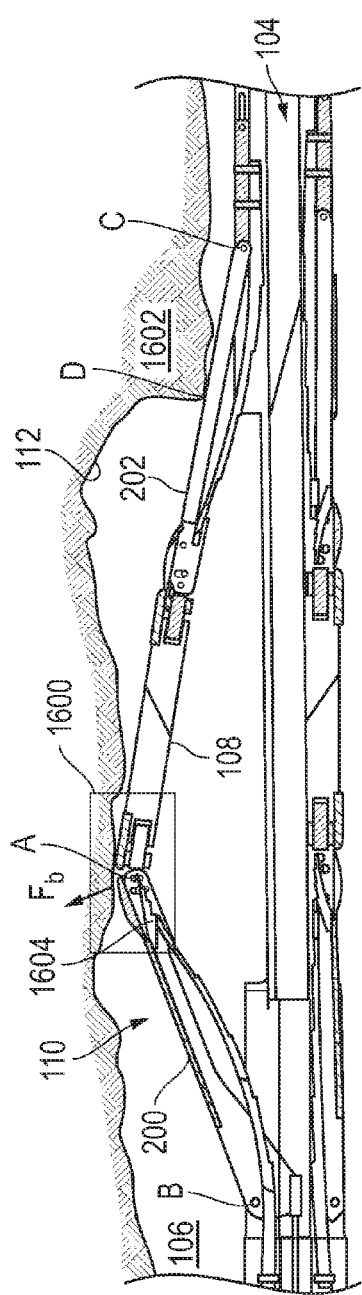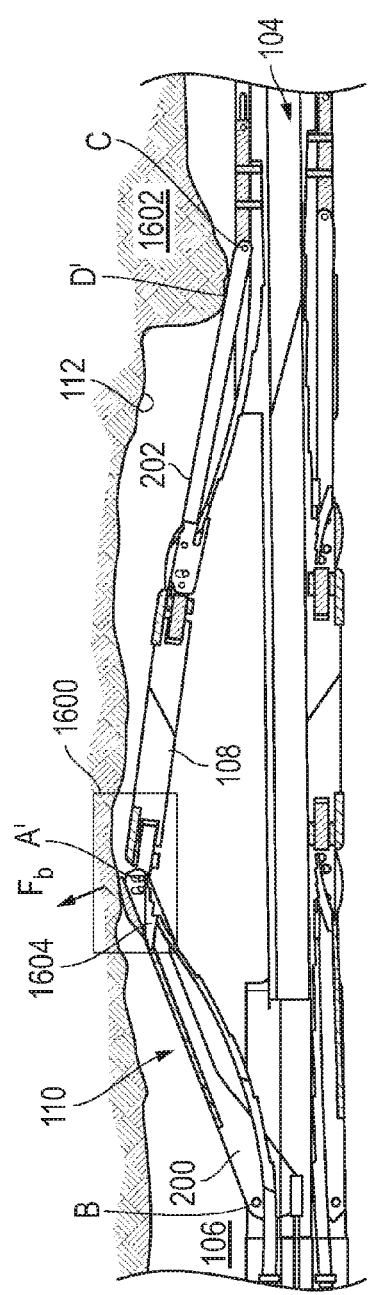

INTERLEAVED ARM SYSTEM FOR LOGGING A WELLBORE AND METHOD FOR USING SAME

CROSS-REFERENCE TO RELATED APPLICATIONS

This application is a continuation-in-part of co-pending U.S. patent application Ser. No. 12/871,566, filed on Aug. 30, 2010, which is based on and claims the benefit of priority to EP Application No. 09290658, filed Aug. 31, 2009. Applicant has filed co-pending U.S. patent application Ser. No. (not yet assigned) entitled AN ANTILOCK DEVICE FOR USE WITH AN ARM SYSTEM FOR LOGGING A WELLBORE AND METHOD FOR USING SAME contemporaneously herewith, and U.S. patent application Ser. No. (not yet assigned) entitled AN ARM SYSTEM FOR LOGGING A WELLBORE AND METHOD FOR USING SAME contemporaneously herewith. The entire contents of each are herein incorporated by reference.

TECHNICAL FIELD

The present invention relates to techniques for performing wellbore operations. More particularly, the present invention relates to downhole tools, such as wireline logging, production, drilling, coiled-tubing and/or, other tools having arms (or extensions) for positioning a sensor pad proximate a wellbore wall to measure downhole parameters.

BACKGROUND

For oilfield and hydrocarbon exploration, a downhole drilling tool with a bit at an end thereof is advanced into the ground to form a wellbore. As the drilling tool is advanced, a drilling mud is pumped through the drilling tool and out the drill bit to cool the drilling tool and carry away cuttings. The drilling mud exits the drill bit and flows back up to the surface for recirculation through the tool. The drilling mud may also be used to form a mud cake to line the wellbore.

During and after the drilling operation, it is particularly useful to perform various downhole evaluations, such as testing, sampling, and/or scanning a subsurface geological formation to provide data representing the various strata and hydrocarbons that constitute the subsurface formation (referred to collectively herein as "logging"). In some cases, the drilling tool may be provided with devices to log the surrounding formation. In some cases, the drilling tool may be removed and a wireline logging tool may be deployed into the wellbore to log the formation. Logging may also be performed during other wellbore operations, such as treatment, production, etc.

The wellbore formed by the drilling tool is typically non-uniform and may contain obstructions, bumps or other non-uniformities in the wall of the wellbore. These non-uniformities (as well as other conditions in the wellbore) may cause damage to the downhole tool and/or its components.

Attempts have been made to provide downhole tools with devices that retract during transport through the wellbore and expand for contact with the wellbore wall. Some techniques involve downhole tools with extendable arms as described, for example, U.S. Pat. Nos. 4,614,250, 4,926,937, 4,979,585, 5,092,056, 6,702,010, 5,022,484, 7,069,775, 7,131,210. Various downhole tools with sensors positioned on extendable arms have been developed, such as the FSI™, NCMI™, and HDT™ tools, commercially available from SCHLUMBERGER™; the OMRI™ and EMI™ tools, commercially available from HALLIBURTON™; the STAR™ and EARTHIMAGER™, commercially available from BAKER HUGHES™ INC.; and the MICROIMAGER™, commercially available from WEATHERFORD™ INTL. Some attempts involve the use of logging tools for logging as they are passed through the wellbore, sometimes referred to as "log-down kits."

Despite the development of techniques involving downhole tools with extendable arms, there remains a need to provide advanced techniques for effectively positioning sensors against the wellbore wall; and in particular, sensors used to provide an image of the formation's properties to a user/operator at the surface. It may be desirable to provide techniques that enable logging as the downhole tool passes through the wellbore. It may be further desirable to provide techniques to enhance contact with the wellbore wall. Preferably, such techniques involve one or more of the following, among others: bi-directional logging of the wellbore, increased contact of the pad with the wellbore wall, increased coverage of the wellbore wall, verification of the previously logged areas, enhanced (e.g., uniform) engagement with the wellbore wall, and/or resistance to sticking in the wellbore.

SUMMARY OF THE DISCLOSURE

According to an aspect of the present disclosure, one or more embodiments relate to a logging tool having at least two arm sets for logging a wellbore having a wellbore wall and at least one subterranean formation thereabout. The two arm sets are positionable on a downhole tool deployable into the wellbore, and preferably include a first arm set, a second arm set, and an overlap tool body. The first arm set has at least two azimuthally spaced first arm systems with a sensor pad coupled to two arms. The two arms have an upper connection and a lower connection on a tool body of the downhole tool. The second arm set has at least two azimuthally spaced second arm systems with a sensor pad coupled to two arms. The two arms have an upper connection and a lower connection on the tool body, and wherein the upper connection of the second arm set are longitudinally overlapped between the lower connections of the first arm set. The overlap tool body portion for coupling the upper connection of the second arm set and the lower connections of the first arm set to the downhole tool.

According to another aspect of the present disclosure, one or more embodiments relate to a system for logging a wellbore having a wellbore wall and at least one subterranean formation thereabout. The system preferably includes a downhole tool having at least two arm sets deployable into the wellbore, the at least two arm sets comprising a first arm set having at least two azimuthally spaced first arm systems with a sensor pad coupled to two arms. The two arms of the first arm system has an upper connection and a lower connection on a tool body of the downhole tool. The at least two arm sets further comprise a second arm set having at least two azimuthally spaced second arm systems with a sensor pad coupled to two arms. The two arms of the second arm system has an upper connection and a lower connection on the tool body and wherein the upper connection of said second arm set are longitudinally overlapped between the lower connections of the first arm set. An overlap tool body portion is provided for coupling the upper connection of the second arm set and the lower connections of the first arm set to the downhole tool. At least one sliding shuffle is preferably coupled to the overlap tool body portion and adapted to allow at least one of the arm sets to translate along a longitudinal axis of the tool body.

According to yet another aspect of the present disclosure, one or more embodiments relate to a method for logging a wellbore having a wellbore wall and at least one subterranean formation thereabout. The method preferably comprises deploying a downhole tool into the wellbore. The downhole tool having at least two arm sets thereon. The at least two arm sets comprising a first arm set having at least two azimuthally spaced first arm systems with a sensor pad coupled to two arms. The two arms of the first arm system has an upper connection and a lower connection on a tool body of the downhole tool. The at least two arm sets further comprise a second arm set having at least two azimuthally spaced second arm systems with a sensor pad coupled to two arms. The two arms of the second arm system has an upper connection and a lower connection on the tool body and wherein the upper connection of said second arm set are longitudinally overlapped between the lower connections of the first arm set. An overlap tool body portion is provided for coupling the upper connection of the second arm set and the lower connections of the first arm set to the downhole tool. At least one sliding shuffle is preferably coupled to the overlap tool body portion and adapted to allow at least one of the arm sets to translate along a longitudinal axis of the tool body. The method further comprises maintaining each of the pads in an engaged position against the wellbore wall by self-adjusting the pad between a closed position proximate the tool body and the engaged position proximate the wellbore wall as the pad moves through the wellbore. Moreover, the method comprises measuring at least one downhole parameter with the pad.

These together with other aspects, features, and advantages of the present disclosure, along with the various features of novelty, which characterize the invention, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following detailed description in combination with the accompanying drawings. Accordingly, the drawings and description are to be regarded as illustrative in nature, and not restrictive.

BRIEF DESCRIPTION OF THE DRAWINGS

Implementations of the disclosure may be better understood when consideration is given to the following detailed description thereof. Such description makes reference to the annexed pictorial illustrations, schematics, graphs, drawings, and appendices. In the drawings:

FIGS. 17A and 17B depict a schematic side view of the arm systems of FIG. 15 with the anti-locking device moving between the released position and the engaged position;

DETAILED DESCRIPTION

Figure 1:
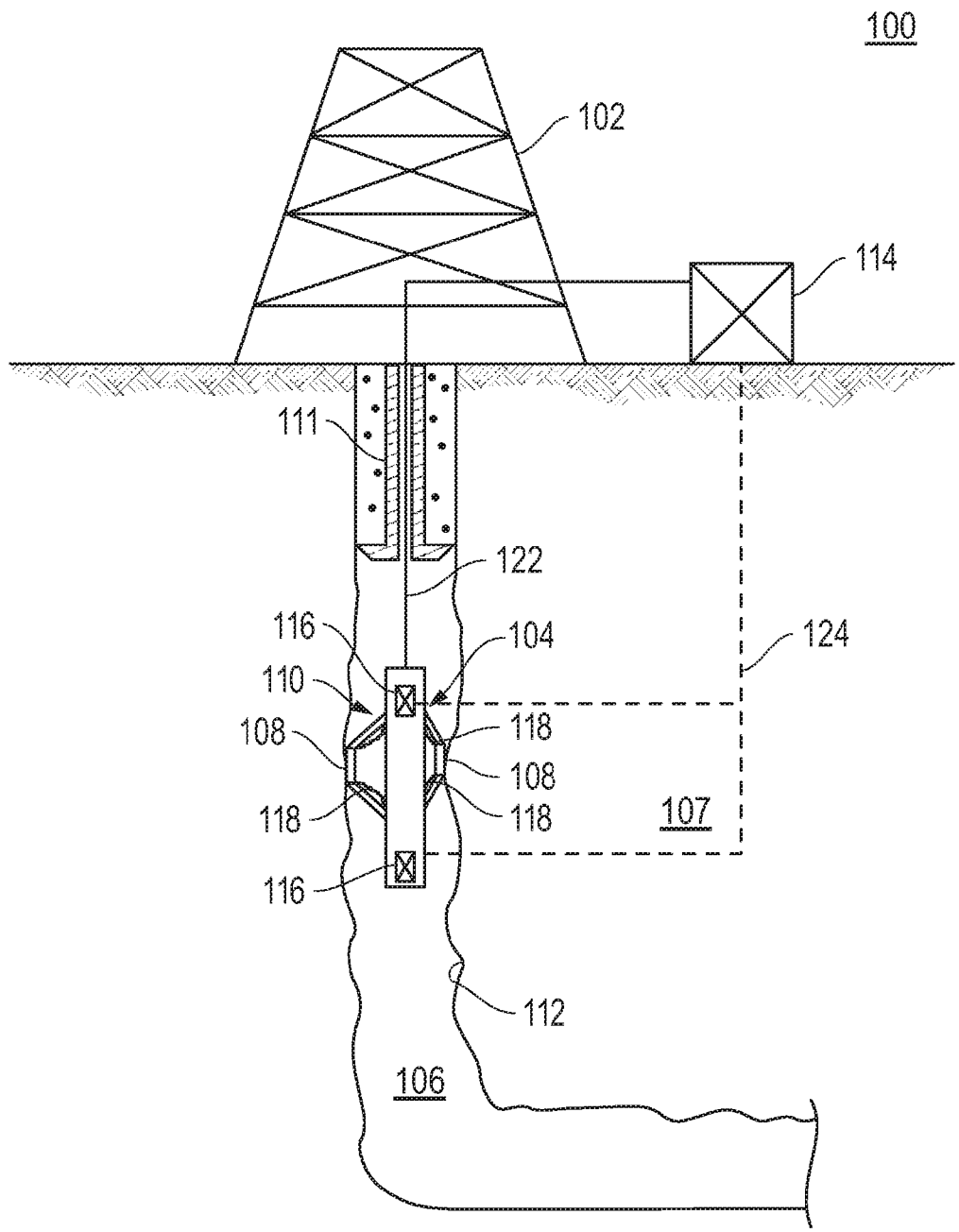
FIG. 1 depicts a schematic view of a system for logging a wellbore having an arm system on a downhole tool constructed in accordance with an embodiment of the present disclosure for locating a pad proximate a wellbore wall.

Presently preferred embodiments of the disclosure are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIG. 1 depicts a schematic view of a wellsite 100 having an oil rig 102 with a downhole tool 104 suspended into a wellbore 106 therebelow. The wellbore 106 has been drilled by a drilling tool (not shown) through one or more formations 107.

A drilling mud, and/or a wellbore fluid, may have been pumped into the wellbore 106 and may line a wall thereof. A casing 111 may also be positioned in a portion of the wellbore 106 and cemented into place therein.

The downhole tool 104 may include one or more sensors, sensor pads, or pads 108, for determining one or more downhole parameters, such as formation parameters and/or wellbore fluid parameters (e.g., temperature, pressure, viscosity, resistivity/microresistivity, composition, etc.).

The downhole tool 104 may have one or more arm systems 110 configured to locate the pad 108 proximate a wellbore wall 112. The arm system 110 of the downhole tool 104 permits the pad 108 to expand and contract in a radial plane to accommodate changes in wellbore diameter as the downhole tool 104 travels into and/or out of the wellbore 106, as will be discussed in more detail below. The arm system 110 may have one or more actuators 116 and/or one or more biasing members 118, or resilient members, for moving the pads 108 while the downhole tool 104 travels within the wellbore 106.

The downhole tool 104 is shown as a wireline logging tool, lowered into the wellbore 106 to take various measurements. Although the downhole tool 104 is shown as being conveyed into the wellbore 106 on a wireline 122, it should be appreciated that any suitable conveyance may be used, such as a slickline, coiled tubing, a drill string, a casing string, self-conveyed (e.g., a tractor), and the like. The downhole tool 104 may be operatively connected to a surface unit 114 for communication therebetween. The downhole tool 104 may be wired via the wireline 122, as shown, and/or wirelessly linked via the one or more telemetry devices (not shown). The one or more telemetry devices may include any telemetry devices, such as electromagnetic, acoustic, mud pulse and the like, for passing signals to the surface unit 114, as indicated, by a communication link 124. Further, it should be appreciated that any communication device or system may be used to communicate between the downhole tool 104 and the surface unit 114. Signals may be passed between the downhole tool 104 and the surface unit 114 and/or other locations for communication therebetween.

The pad 108 may be any conventional sensor pad for determining downhole parameters. Although not shown in detail, the pads 108 may include a plurality of electrodes for measuring the downhole parameters. Such electrodes may include at least one button electrode and at least one source or return electrode and at least one guard electrode to enable micro-electrical imaging of an area near the wellbore 106. The pad 108 may communicate with the surface unit 114 and/or the wireline 122 via the one or more communication links 124. The communication links 124 between the pad 108 and the wireline 122 may be hardwired within the arm system 110 and/or the downhole tool 104. Further, the communication links 124 from the pad 108 may be wireless connections to the wireline 122, the surface unit 114 and/or the downhole tool 104. It should be appreciated however, that the downhole tool 104 may comprise an internal memory for recording the measured downhole parameters.

Figure 2A:
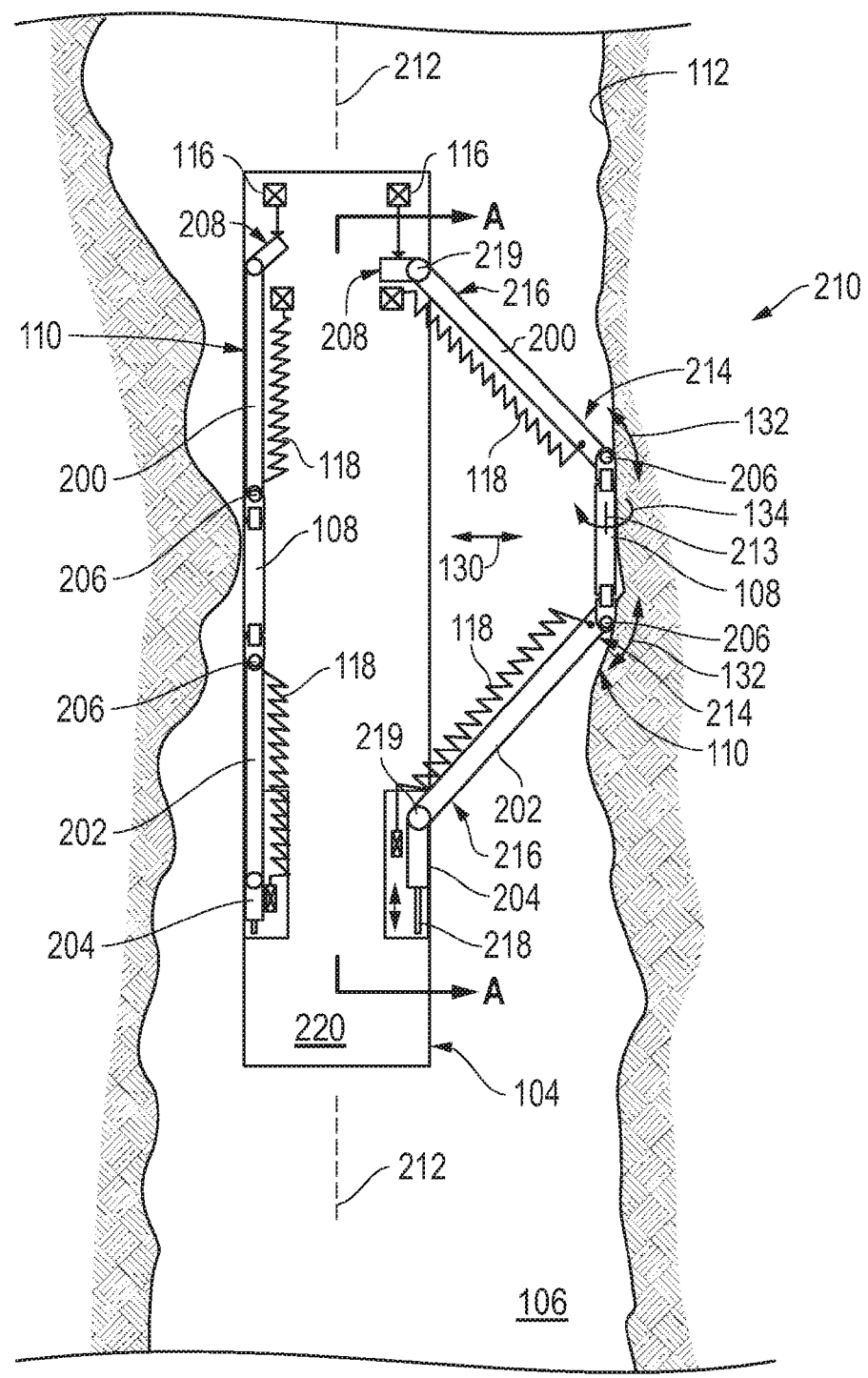
FIG. 2A depicts a schematic view of the downhole tool of FIG. 1.

FIG. 2A depicts a schematic view of the downhole tool 104 having the arm system 110 for locating the pad 108 proximate the wellbore wall 112. Each of the arm systems 110 may have one or more biasing members 118, one or more actuators 116, an upper/first arm 200, a lower/second arm 202, a sliding shuffle 204, and one or more swivel bearings 206.

As shown and described in more detail hereinafter, the downhole tool 104 has the plurality of arm systems 110 that form an arm set 210. It should be appreciated that the arm set 210 may have any number of the arm systems 110 for determining downhole parameters. Further, there may be multiple arm sets 210 located along the downhole tool 104.

The arm systems 110 preferably allow the downhole tool 104 to move the pad 108 with a radial displacement 130, an axial tilt 132 and a tangential tilt 134 during logging in order to maintain contact with the wellbore wall 112 and allow the pad 108 to self-adjust with respect to undulations of the wellbore wall 112. More specifically, the radial displacement 130 allows the pad 108 to move radially toward and away from a central (or longitudinal) axis 212 of the downhole tool 104; wherein, the axial tilt 132 allows the pad 108 to move at an angle relative to the central axis 212 of the downhole tool 104. Further, the tangential tilt 134 allows the pad 108 to rotate about a pad central axis 213. The swivel bearings 206 may allow the pad 108 and the arm 200/202 to pivot relative to one another, in addition to allowing the pad 108 to rotate about the pad central axis 213, while any portion of the pad 108 moves toward and away from a tool body 220.

The arm system 110 is shown as having two arms: the upper arm 200 and the lower arm 202. The upper/first arm 200 and the lower/second arm 202 may have a fixed length defined between an arm tool end (or arm first end) 216 and an arm pad end (or arm second end) 214. The arm pad end 214 of each of the arms 200 and 202 may couple to the pad 108 via the swivel bearings 206. As depicted in FIG. 2A, the arm tool end 216 of the lower/second arm 202 is shown to couple to the sliding shuffle 204 with a pivot connection 219, while the arm tool end 216 of the upper/first arm 200 is shown to couple to the tool body 220 also with a pivot connection 219. The pivot connection 219 between the lower arm 202 and the sliding shuffle 204, and/or between the upper arm 200 and the tool body 220, may be any suitable connection that allows the arm 200/202 to pivot at an angle relative to the central axis 212 of the downhole tool 104, such as a pin connection, and the like. An arm actuation portion 208 may be provided at/near the arm tool end 216 of the upper arm 200 to actuate the arm system 110 between a closed position and an engaged position. Although, the upper arm 200 is shown in FIG. 2A as coupling to the arm actuation portion 208 and the lower arm 202 is shown coupling to the sliding shuffle 204, the upper arm 200 may couple to the sliding shuffle 204 and lower arm 202 may couple to the arm actuation portion 208. Further, both the upper/first arm 200 and the lower/second arm 202 may couple to separate sliding shuffles 204, as shown in FIG. 2B, or alternatively, to separate arm actuation portions 208 (not shown).

Figure 2B:
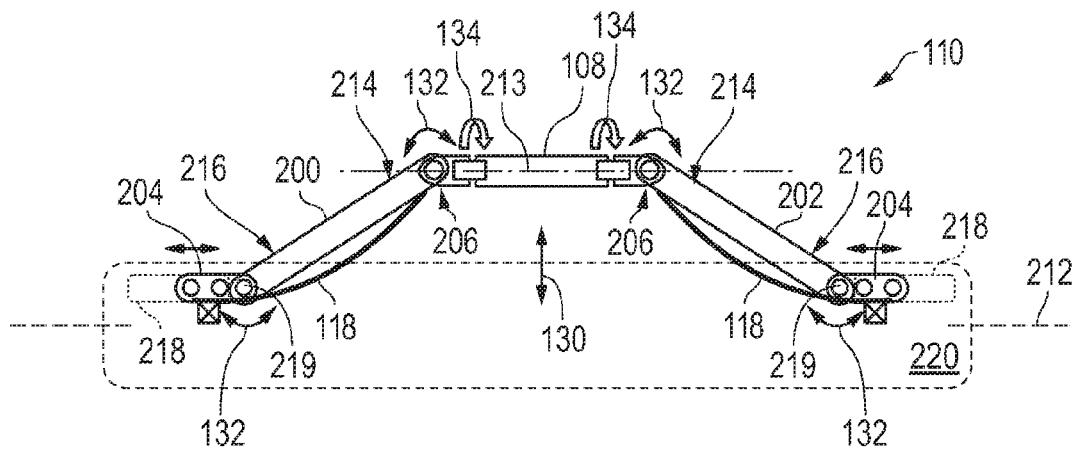
FIG. 2B depicts a schematic view of an arm system constructed in accordance with an embodiment of the present disclosure.

Referring in particular to FIG. 2B, the sliding shuffle 204 may be any device configured to move an end of at least one of the arms 200/202 in a direction that is substantially parallel to the central (or longitudinal) axis 212 of the downhole tool 104. The sliding shuffle 204 may be configured to move substantially parallel to the central axis 212 in a slot 218 formed in the tool body 220 of the downhole tool 104. The slot 218 may take any form so long as the sliding shuffle 204 is configured to move with an end of one of the arms 200/202 in the slot 218. The sliding shuffle 204 may allow the arm 200/202 and therefore, the pad 108 to move in response to the pad 108 and/or the arm system 110, engaging upsets in the wellbore wall 112, as will be discussed in more detail below.

Figure 2C:
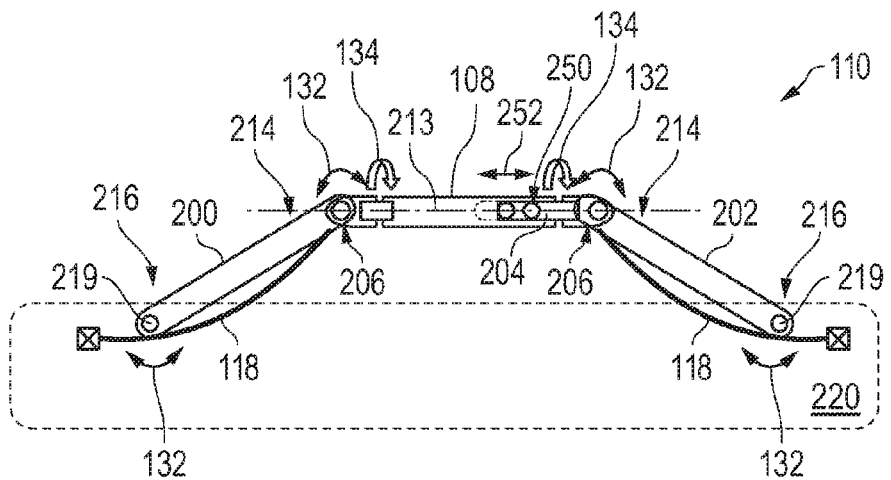
FIG. 2C depicts a schematic view of an alternative arm system constructed in accordance with an embodiment of the present disclosure.

FIG. 2C depicts the arm system 110 showing both the first arm 200 and the second arm 202 as coupling to the pivot connection 219 and not having the sliding shuffle 204 attached directly to the tool body 220. In this embodiment, the swivel bearing 206 may form an alternate version of the sliding shuffle 204, which may be referred to herein as a sliding swivel bearing, having a slide 250 between the pad 108 and a portion of the swivel bearing 206. The slide 250 may allow at least a portion of one of the arms 200/202 to longitudinally translate along arrow 252, relative to the pad 108 during operation.

Figure 3:
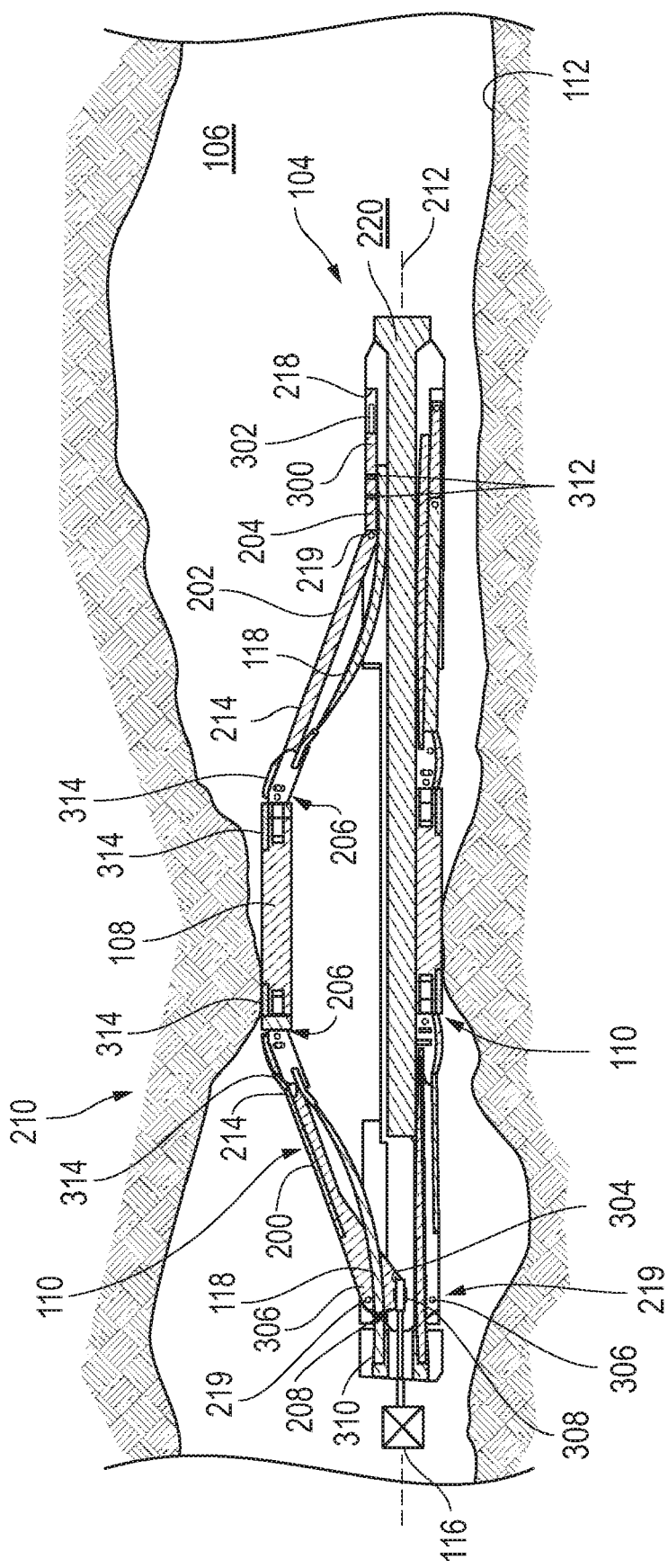
FIG. 3 depicts a cross-sectional view of the downhole tool of FIG. 2A along line A-A.
Figure 4:
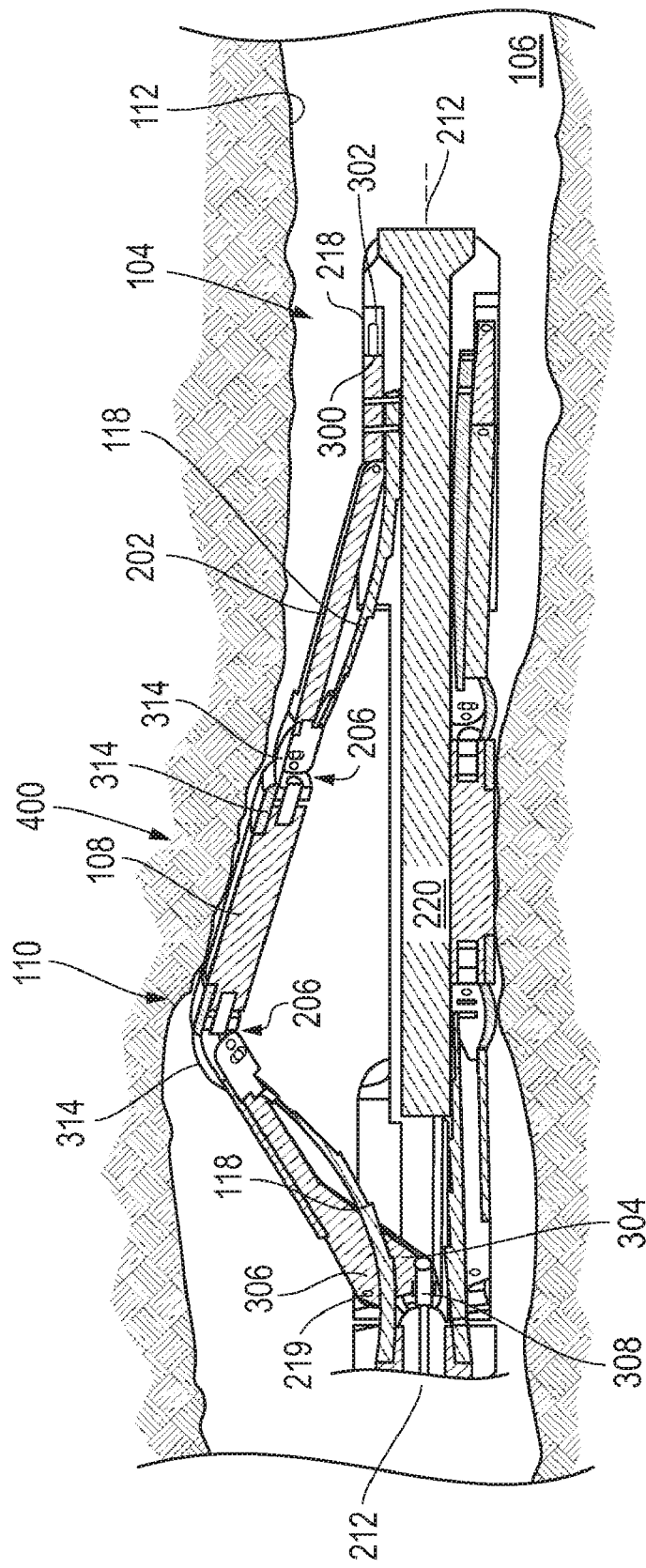
FIG. 4 depicts a cross-sectional view of the downhole tool of FIG. 3 against an upset in the wellbore.

FIGS. 3 and 4 show partial cross-sectional views of the downhole tool 104 of FIG. 2A taken along line A-A, but in different positions in wellbore 106. As shown in these figures, the sliding shuffle 204 has a rectangular prism shape configured to move in the slot 218, although the sliding shuffle 204 may have any suitable shape. The sliding shuffle 204 may have one or more guides 300 configured to travel in a guide slot 302. The guide(s) 300 and the guide slot 302 may maintain the sliding shuffle 204 in alignment with the direction of travel as the sliding shuffle 204 translates in response to the pad 108 or actuator 116 movement. Although the guide 300 and the guide slot 302 are shown to guide the sliding shuffle 204 as it travels, any suitable device may be used. For example, the sliding shuffle 204 may be partially enclosed in the slot 218, and the like.

The arm actuation portion 208, as shown in FIGS. 2A and 3, may couple to the first arm 200 and at least one of the actuators 116. As shown in FIG. 3, the arm actuation portion 208 is a portion of the first arm 200 that extends from an actuation arm pivot end 306 to an actuation arm actuation end 304. The actuation arm pivot end 306 may be coupled to an outer portion of the tool body 220 at the pivot connection 219, similar to those described herein. The actuation arm actuation end 304 may be located toward the central axis 212 of the tool body 220 and coupled to a motivator 308 of the actuator 116.

The actuator 116 may be configured to move the motivator 308 and thereby the actuation arm actuation end 304. As the motivator 308 moves toward the closed position, the actuation arm actuation end 304 moves longitudinally away from the pad 108, thereby rotating the actuation arm pivot end 306 about the pivot connection 219. The rotation of the actuation arm pivot end 306 rotates the first arm 200 toward the closed position as shown by the bottom arm system 110 in FIG. 3. Although the arm actuation portion 208 is shown as an integral part of the first arm 200, the arm actuation portion 208 may be a separate arm, so long as it is capable of moving the first arm 200 between the closed and engaged positions. Further, the actuator 116 may be configured to connect to any suitable device for actuating the arm system 110, for example, the actuator 116 may connect to and/or actuate the first arm 200, the second arm 202, the biasing member(s) 118, the sliding shuffle 104 and the like.

The actuator 116 may be any suitable actuator for moving the first arm 200 against the force of the biasing members 118, such as a hydraulic piston and cylinder, a servo, a pneumatic piston and cylinder, and the like. There may be one actuator 116 per arm system 110 within the arm set 210; there may be one actuator 116 for any number of the arm systems 110 within the arm set 210; there may be one actuator 116 for any number of the arm systems 110 across multiple arm sets 210; or there may be one actuator 116 per arm set 210. Where there is one actuator 116 per arm system 110 within an arm set 210, each of the arm systems 110 in the arm set 210 may be individually actuated by separate actuators 116. Where there is the one actuator 116 for the plurality of arm systems 110 within the arm set 210, or across the multiple arm sets 210, or for all the arm systems 110 within the arm set 210, the one actuator 116 may actuate the various arm systems 110 from one location on the tool body 220. In a preferred embodiment, the actuator(s) 116 actuates the arm system(s) 110 toward the closed position, and the biasing member(s) 118 bias the pads 108 toward an engaged, or logging, position.

In an alternative embodiment, the actuator(s) 116 may be configured to motivate the pad 108 toward the engaged position while the biasing members 118 bias the pad 108 toward the closed position by, for example, reversing the acting direction of the biasing members 118. In this embodiment, the actuator(s) 116 may be actuated in order to move the pad 108, the first arm 200, and the second arm 202 into the closed position. As such, the shock absorbing function of the biasing members 118 may avoid jamming of the arm system 110 into the wellbore wall 112 from, for example, excessive hydraulic pressure from the actuator 116.

In another alternative design, the arm systems 110 may not have an actuator 116. In this embodiment, the first and second arms 200 and 202 may be biased toward the engaged position by, for example, the biasing members 118. The arm system 110 in this embodiment may not require the arm actuation portion 208, as both the first arm 200 and the second arm 202 may couple to the tool body 220 and/or the sliding shuffle 204 with the pivot connection 219.

The biasing members 118, the sliding shuffle 204, and/or the swivel bearing 206 are preferably adapted to move the pad 108 between a closed position and an engaged position proximate the wellbore wall 112. The biasing members 118, or resilient members, are configured to bias the pad 108 relative to the tool body 220. For example, as shown and described herein, the biasing members 118 may be configured to bias the first arm 200 and the second arm 202 toward the engaged position. In the engaged position, the first arm 200 and the second arm 202 may move the pad 108 proximate to the wellbore wall 112, as shown by the arm system 110 on the top of the tool body 220 in FIG. 3. As shown in FIG. 3, the biasing members 118 are leaf springs. However, the biasing members 118 may be any device and/or system for biasing the arm systems 110, such as a coiled spring, a hinge spring and the like. Moreover, it should be appreciated that rather than implementing one biasing member 118 per arm 200/202, that only one biasing member 118 per arm system 110 may be configured to bias the pad 108 proximate the wellbore wall 112. For example, the biasing member 118 may couple to the first arm 200, the second arm 202, the swivel bearing 206, or the pad 108. The one biasing member 118 may manipulate the arm system 110 in a similar manner to the two biasing members 118, as described herein.

In a preferred embodiment, the actuator(s) 116 may overcome the biasing force of the biasing members 118 in order to move the first arm 200 and the second arm 202, and therefore the pad 108, into the closed position. When the force is released from the actuator(s) 116, the biasing members 118 may move the pad 108 back to the engaged position.

Where there are multiple biasing members 118 in the arm system 110, the biasing members 118 preferably apply a substantially equal force, or spring factor, relative to one another. The substantially equal force may ensure that the force applied to the first arm 200 and the second arm 202 by the biasing member 118 is substantially similar. The substantially equal force applied by the biasing members 118 may allow for a means of symmetric pad 108 movements and engagement with the wellbore wall 112. The substantially similar biasing force may allow the distribution of force along the pad 108 to be evenly distributed. Further, it is believed that this dual acting biasing member 118 arrangement may act as a shock absorber as the pad 108, the first arm 200, and/or the second arm 202 engage one or more upsets 400 (as shown in FIG. 4) in the wellbore wall 112. Further, the biasing members 118 for the first arm 200 and the second arm 202 may have different spring rates (k) depending on the design of the arm system 110.

As shown in FIG. 3, each of the biasing members 118 may be coupled to the arm pad end 214 of the first arm 200 and the second arm 202. The biasing member 118, coupled to the first arm 200, may be coupled to a fixed bias member connection 310 on the tool body 220. The biasing member 118 coupled to the second arm 202 may be fixedly coupled to the sliding shuffle 204 by, for example, two pin connections 312. Thus, as the sliding shuffle 204 translates, the biasing member 118 coupled to the second arm 202 may travel with the sliding shuffle 204. While the biasing member 118 coupled to the second arm 202 is shown to be fixedly coupled to the sliding shuffle 204 via the two pin connections 312, the connection between the sliding shuffle 204 and the biasing member 118 may be any suitable device to join the biasing member 118 and the tool body 220 and/or the sliding shuffle 204, such as a bolt, a screw, a weld, and the like.

The first arm 200, the second arm 202, the swivel bearing 206, and/or the pad 108 may have one or more wear plates 314. The wear plates 314 are preferably configured to engage the surface of the wellbore wall 112 as the downhole tool 104 travels into and/or out of the wellbore 106. The wear plates 314 may prevent the pad 108, the swivel bearing 206, the first arm 200, and/or the second arm 202 from becoming damaged by the non-uniform wellbore wall 112. The wear plates 314 may be constructed of any suitable material for engaging the wellbore wall 112, such as steel, tungsten carbide, metal, and the like. Further, the wear plates 314 may be hard-faced in order to further prevent wear of the wear plates 314. Moreover, it may be desirable to configure the wear plates 314 to provide a minimum distance or stand-off between the sensors/electrodes in the pad 108 and the wellbore wall 112, for example, to obtain a better resolution of the formation 107 (as shown in FIG. 1).

FIG. 4 shows a cross-sectional perspective view of the downhole tool 104 of FIG. 2A taken along line A-A. FIG. 4 depicts one of the arm systems 110 engaging the wellbore wall 112 that has the upset 400 which causes the pad 108 to translate at an angle relative to the central axis 212 of the downhole tool 104. As the wear plates 314 of the second arm 202 and/or the pad 108 engage the wellbore wall 112, the swivel bearing 206 between the second arm 202 and the pad 108 allows the second arm 202 to rotate relative to the pad 108. This rotation may allow the pad 108 to follow the contour of the upset 400. The rotation may further cause the sliding shuffle 204 and therefore, the second arm 202 to longitudinally translate along the tool body 220 in the slot 218 in order to accommodate the changed position of the pad 108.

Figure 5:
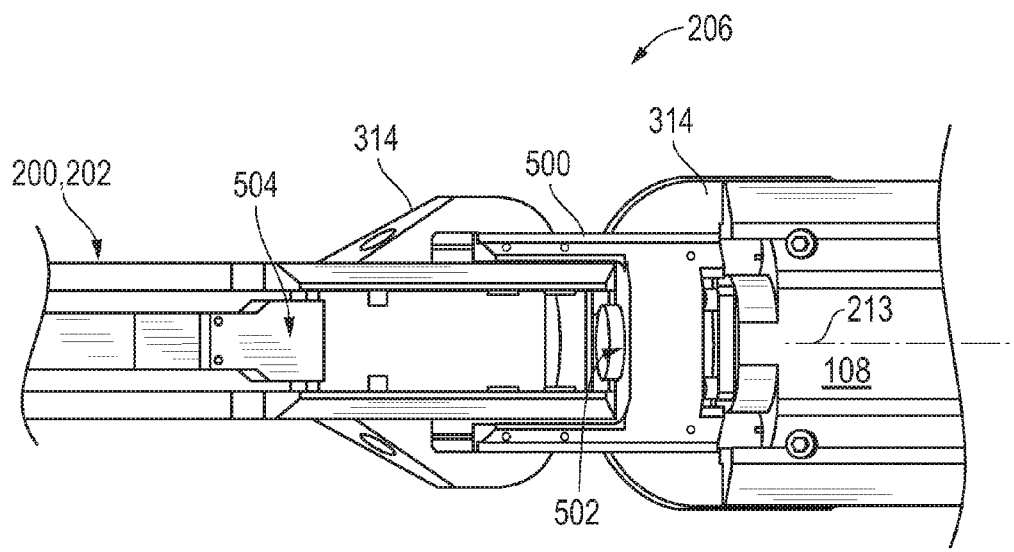
FIG. 5 depicts a schematic bottom view of a swivel bearing of FIG. 3.

FIG. 5 depicts a bottom view of one embodiment of the swivel bearing 206. The swivel bearing 206 is preferably configured to provide a connection between the pad 108 and the first arm 200 and/or the second arm 202, and allow the pad 108 to pivot relative to the arm 200/202. The swivel bearing 206 may further allow the pad 108 to rotate tangentially and/or translate longitudinally relative to the arm 200/202, as will be described in more detail below. The swivel bearing 206 may have a fork 500 that pivotally couples to a bearing 502, thereby allowing the pad 108 to tangentially pivot (or swivel) about the pad central axis 213. The fork 500 may couple to the arm 200/202, while the bearing 502 may couple to the pad 108, although this arrangement may be reversed so long as the swivel bearing 206 allows for pivoting between the arms 200/202 and the pad 108. The fork 500 may pivotally attach to the arm pad end 214, or distal end, of the arms 200/202. Although, the swivel bearing 206 is shown as the fork 500 pivotally coupled to the bearing 502, the swivel bearing 206 may be any suitable device allowing the pad 108 to pivot relative to the arms 200/202, for example, a pin connection, a roller bearing, and the like.

Figure 6:
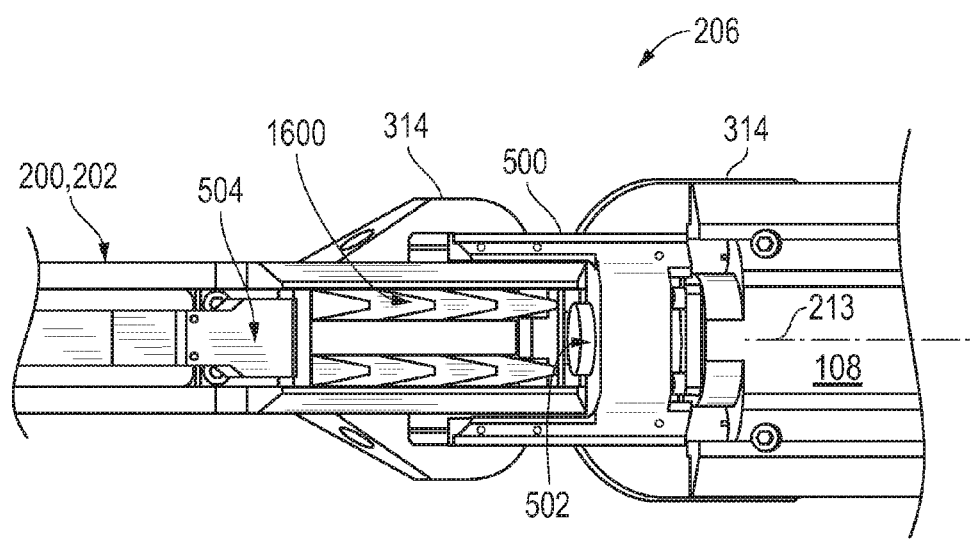
FIG. 6 depicts a schematic bottom view of an alternate swivel bearing constructed in accordance with an embodiment of the present disclosure.

FIG. 6 depicts a bottom view of another embodiment of the swivel bearing 206. The swivel bearing 206, as shown, may have an anti-locking device 1600 as will be described in more detail below.

Figure 7A:
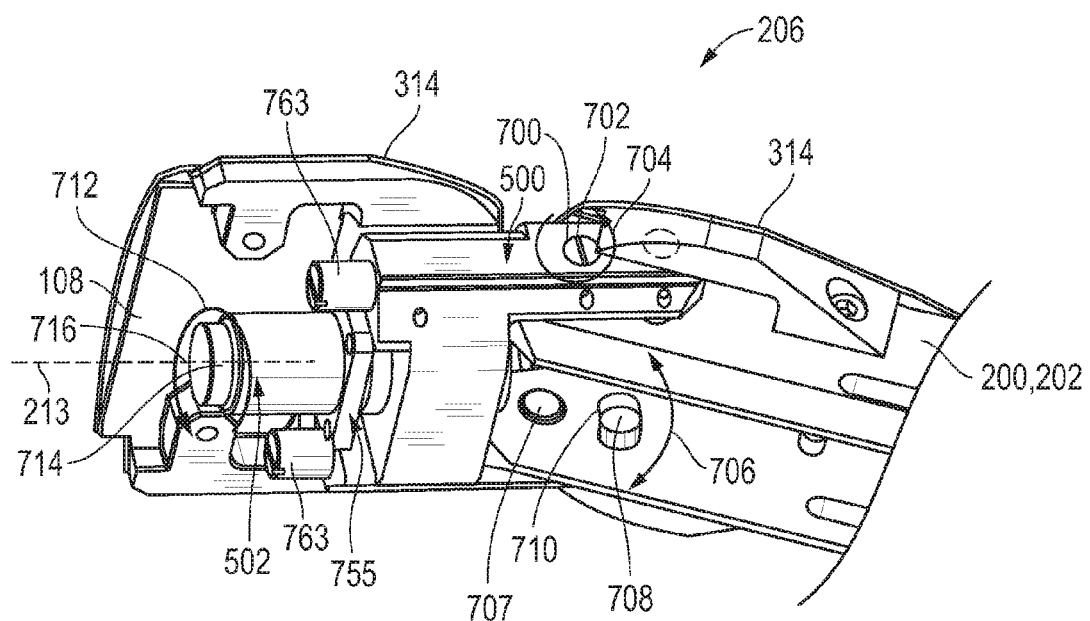
FIG. 7A depicts a schematic perspective view of the swivel bearing of FIG. 5.

FIG. 7A depicts a bottom perspective view of the swivel bearing 206 shown in FIG. 5. The fork 500 may couple to the arm 200/202 with a pivot pin 702 and/or bolt through an aperture 700. The swivel bearing 206 may allow for axial and/or tangential movement of the pad 108 relative to the arm 200/202. For example, the tangential, or rotational, movement 712 of the pad 108 may be provided between the fork 500 and the pad 108 via the bearing 502. The axial pivot 704 may be provided between the fork 500 and the arm 200/202 via at least one pivot pin 702/707. A limiting pin 708 may be coupled to the fork 500 and/or the arm 200/202, and configured to translate in a radial pivot slot 710 to limit the axial pivot 704 between the arm 200/202 and the swivel bearing 206.

The tangential movement 712 of the pad 108 relative to the arm 200/202 may be provided between the fork 500 and the bearing 502 via at least one rotary pin 714 and a collar 755. The rotary pin 714 and the collar 755 may couple the pad 108 to the fork 500, and allow the fork 500 to rotate about a central axis 716 of the rotary pin 714, which may or may not be aligned with the pad central axis 213. The rotary pin 714 may be secured to the fork 500 (e.g., welded, pin connection, press fit, and the like). The collar 755 may be secured to the pad 108 (not completely shown) via bolts, screws, press fit, adhesive, welding and the like. There may be one or more rotational limit stops, including one or more rotational limit pins 763, which limit the rotation of the pad 108 relative to the fork 500. As may be readily appreciated, the pins 702, 707, 714 and/or the collar 755 may be constructed of any material capable of withstanding harsh reservoir conditions and frictional movement such as, but not limited to, hard steel and bronze.

Figure 7B:
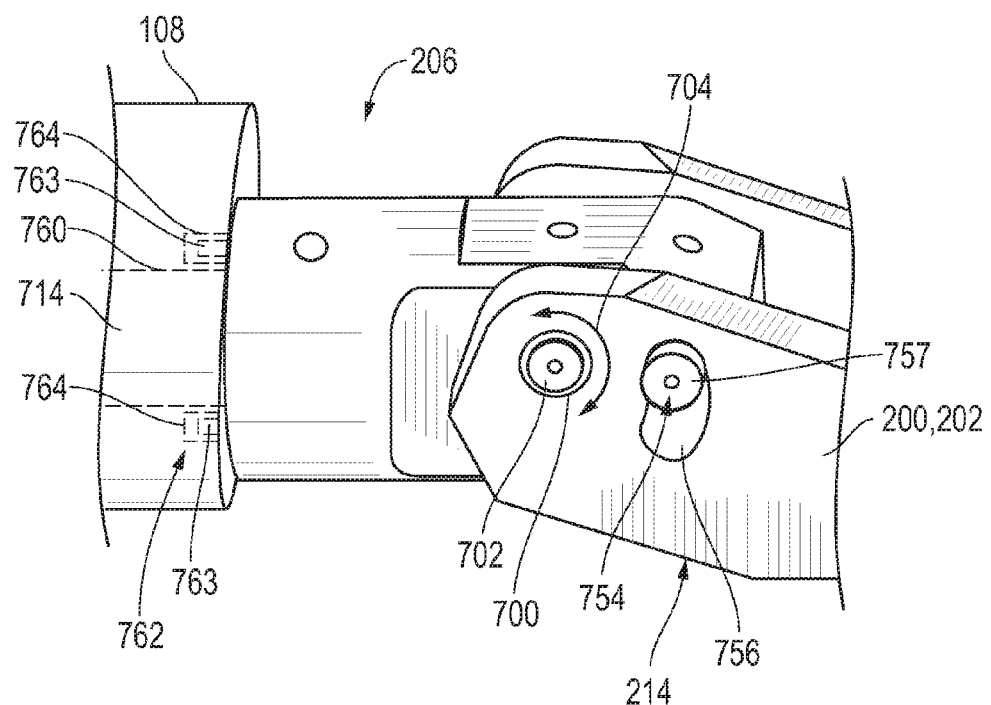
FIGS. 7B-D depict schematic views of an alternate swivel bearing constructed in accordance with an embodiment of the present disclosure.
Figure 7C:
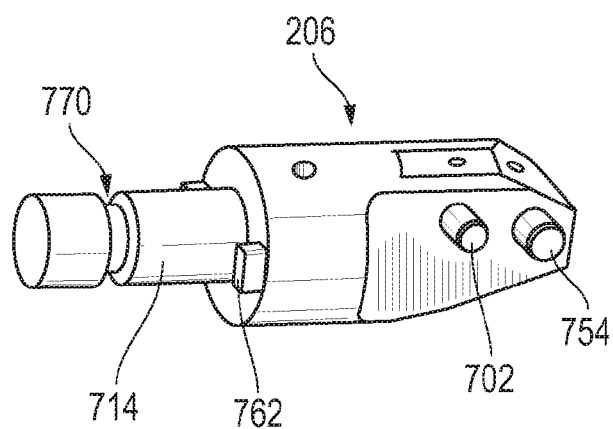
Figure 7D:
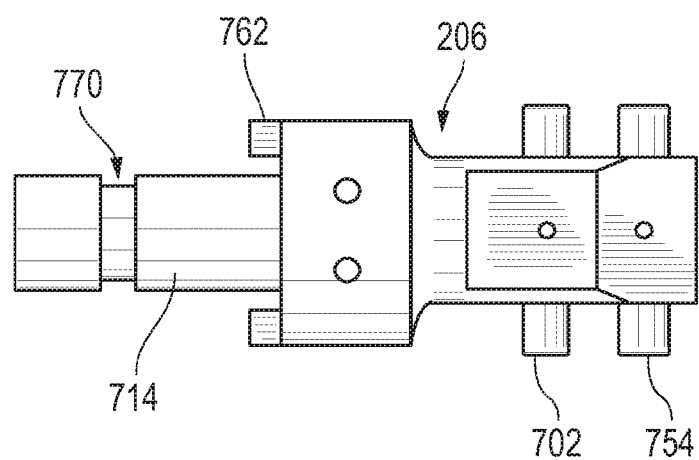

FIGS. 7B-7D depict different views of an alternate embodiment of the swivel bearing 206 also adapted to provide a connection between the pad 108 and the first arm 200 and/or the second arm 202, and allow the pad 108 to pivot relative to the arm 200/202. As shown, the swivel bearing 206 may be coupled to a portion of the pad 108, and a portion of the arm 200/202 at the arm pad end 214. The pivot pin 702 of the swivel bearing 206 may allow the axial pivot 704 between the swivel bearing 206 and the arm 200/202. An axial limit stop 754 may be provided to limit the extent of the axial pivot 704 between the pad 108 and the arm 200/202. The axial limit stop 754, as shown, may include an axial limit pin 757 that may travel in a pivot slot 756 to the predetermined limits of an axial pivot 704, and may be sized accordingly.

Particularly shown in FIG. 7B, the swivel bearing 206 may include the rotary pin 714 to allow tangential movement between the swivel bearing 206 and the pad 108. The pad 108 may further include a pad aperture 760, or a collar (as described hereinbefore), having a cylindrically shaped recess to allow the pad 108 to tangentially rotate, or longitudinally translate, relative to the swivel bearing 206. One or more rotational limit stops 762 may be provided to limit the extent of tangential movement between the pad 108 and the swivel bearing 206. The rotational limit stop 762, as shown, may include the rotational limit pin 763 that may travel in a rotary slot 764 to the predetermined limits of tangential travel, and may be sized accordingly. The tangential movement of the pad 108 shown in FIG. 7B may be similar in construction and function as the tangential movement described in conjunction with FIG. 7A. As may be readily appreciated, the rotary pin 714, the pivot pin 702, and the axial limit pin 757 may be machined as part of the swivel bearing, or may be connected to the swivel bearing 206 via any connection capable of withstanding harsh operations, such as spiral pins, adhesive, bolts, screws, and the like.

Further shown in FIGS. 7C and 7D, the swivel bearing 206 may include one or more longitudinal limit stops 770 to limit the longitudinal translation of the pad 108 relative to the swivel bearing 206. The longitudinal limit stop 770, as shown, may include a recessed (or female) portion of the rotary pin 714 adapted to engage a protruded portion of the pad 108 (not shown) such that the pad 108 may travel to the predetermined limits of longitudinal translation. The longitudinal limit stop 770 may be sized to allow minimal longitudinal translation (e.g. a few millimeters to a few centimeters) or may be sized to allow substantial longitudinal translation (e.g. hundreds of centimeters) between a relative position on the pad 108 and the swivel bearing 206.

Although the swivel bearing 206 is described as having the fork 500 with reference to FIGS. 5, 6 and 7A, or as alternatively described with reference to FIGS. 7B-7D, the swivel bearing 206 may be of any suitable configuration so long as the swivel bearing 206 provides a connection between the pad 108 and the first arm 200 and/or the second arm 202, and allows the pad 108 to pivot relative to the arm 200/202. As described hereinbefore, the swivel bearing 206 preferably allows the pad 108 to rotate tangentially and/or translate longitudinally relative to the arm 200/202, but should not be regarded as a limitation.

Figure 8:
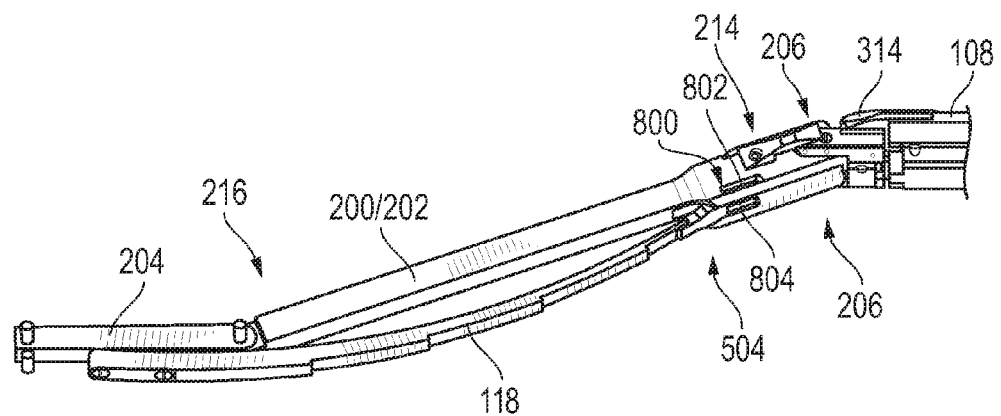
FIG. 8 depicts a schematic side view of a portion of the arm system of FIG. 3 having a biasing member connection on an arm.

FIG. 8 depicts a schematic perspective view of an embodiment of the arm system 110 of FIG. 3 having a biasing member connection 504 wherein the biasing member 118 couples to the arm 200/202 at the arm pad end 214. The biasing member connection 504 is shown as having a translating connection 800 between the biasing member 118 and the arm 200/202. The translating connection 800 may be configured in any number of ways to allow the arm system 110 to have another degree of freedom in addition and/or alternative to the sliding shuffle 204. For example, the translating connection 800 may include a guide pin 802 attached to the biasing member 118 and configured to travel within a guide path 804 in a longitudinal direction relative to the arm 200/202. Therefore, as the pad 108, the wear plate 314 and/or the swivel bearing 206 engage the upset 400 in the wellbore 106 (for example, as shown in FIG. 4), the biasing member 118 may translate relative to the arm 200/202 by allowing the guide pin 802 to travel within the guide path 804. Although not shown, it should be appreciated that the biasing member connection 504 may couple the biasing member 118 and the arm 200/202 at the arm tool end 216.

Figure 9:
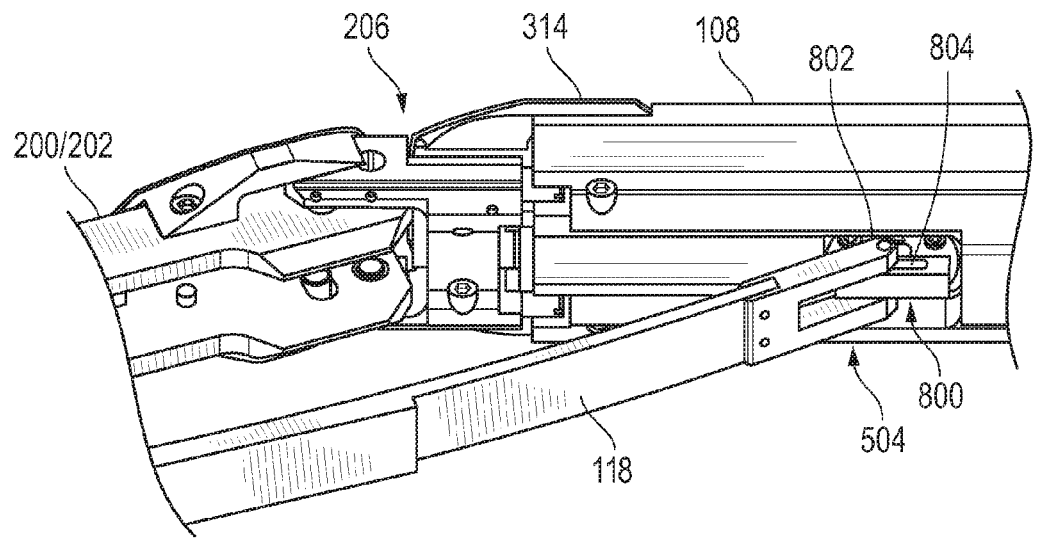
FIG. 9 depicts a schematic view of a portion of the arm system of FIG. 3 having the biasing member connection on a pad.

FIG. 9 depicts a schematic perspective view of another embodiment of the arm system 110 of FIG. 3 having the biasing member connection 504 wherein the biasing member 118 couples to the pad 108. The biasing member connection 504 is shown as having the translating connection 800 between the biasing member 118 and the pad 108. The biasing member connection 504 may operate in any number of ways, for example, as described hereinbefore with reference to FIG. 8; however, the biasing member connection 504 of the present embodiment may couple the biasing member 118 to the pad 108 as an alternative to coupling the biasing member 118 to the arm 200/202. As shown, the translating connection 800 may have the guide pin 802 and the guide path 804 allowing the biasing member 118 to translate relative to the pad 108 in response to the pad 108 and/or the wear plate 314 engaging the upset 400 in the wellbore 106 (for example, as shown in FIG. 4).

Figure 10:
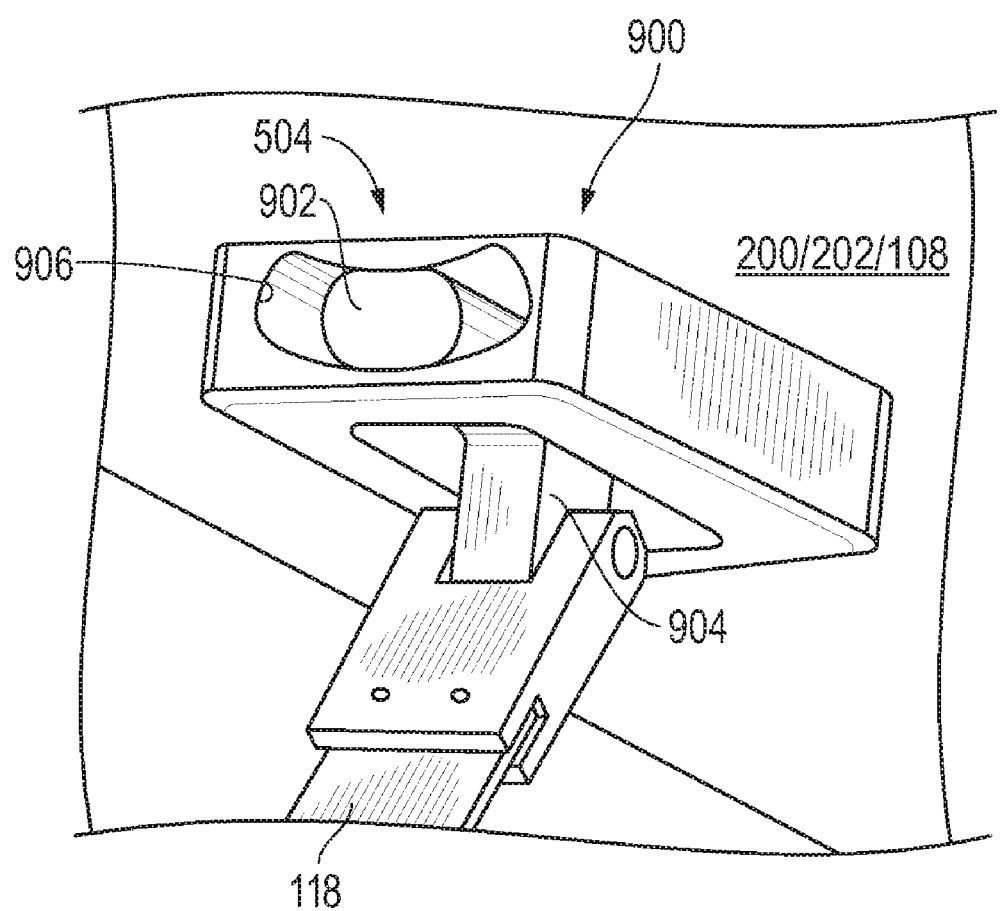
FIG. 10 depicts a schematic view of an alternate biasing member connection.

FIG. 10 depicts a schematic perspective view of an alternative embodiment of the biasing member connection 504 having a swivel connection 900 between the biasing member 118 and either the pad 108, the first arm 200, or the second arm 202. The swivel connection 900 may have a swivel rod 902 that may couple to a pivoting head 904 of the biasing member 118. The swivel rod 902 may translate relative to either the pad 108 or the arm 200/202 within a rod track 906. As the swivel rod 902 translates within the rod track 906, the biasing member 118 may move in a direction substantially perpendicular to the central axis of the downhole tool 104. The swivel rod 902 may further be configured to longitudinally translate along the central axis 213 of the pad 108, or along the arm 200/202.

Figure 11:
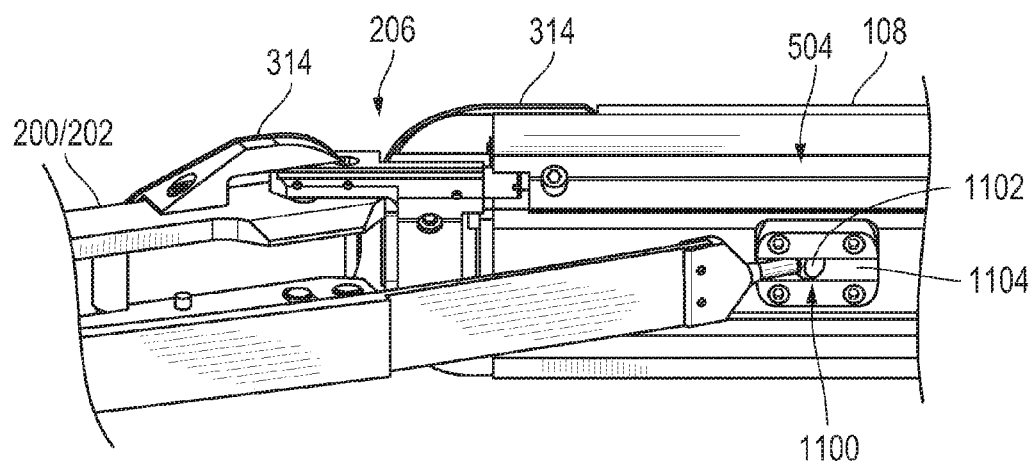
FIG. 11 depicts a schematic view of a portion of the arm system of FIG. 3 having a swivel type biasing member connection on the pad.

FIG. 11 depicts a schematic perspective view of another embodiment of the biasing member connection 504 having a swivel ball connection 1100 between the biasing member 118 and the pad 108. The swivel ball connection 1100 may have a ball 1102 that may couple to the biasing member 118. The ball 1102 may be configured to translate relative to the pad 108 within a ball track 1104. The ball 1102 may be configured to allow the biasing member 118 to move with a degree of tangential and/or longitudinal freedom of movement as the pad 108 and/or the arm 200/202 moves relative to the downhole tool 104. Although the swivel ball connection 1100 is shown as coupling the biasing member 118 to the pad 108, it may likewise couple the biasing member 118 to the arm 200/202. It may be desirable to implement one of the biasing member connections 504 shown in FIGS. 10 and 11 in an embodiment where the biasing member connection 504 couples the biasing member 118 and the pad 108, and where the pad 108 tangentially pivots about the pad central axis 213.

Figure 12:
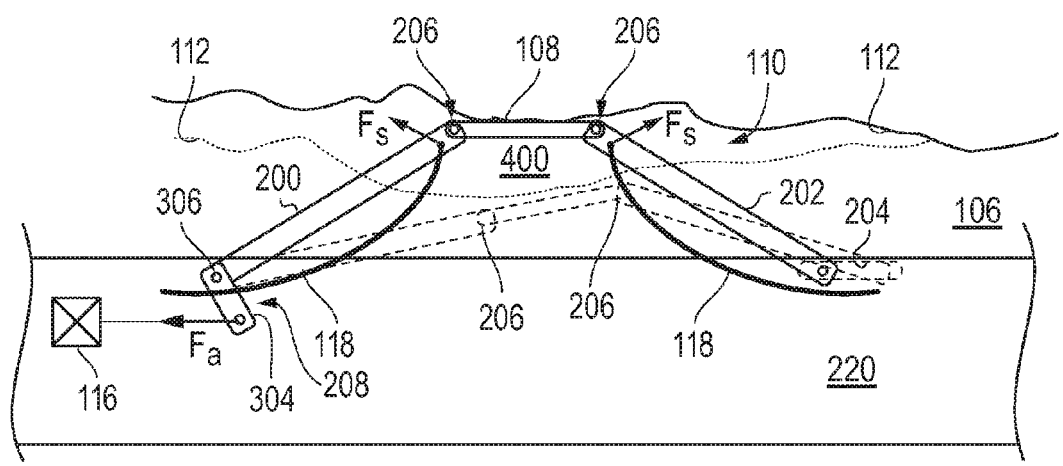
FIG. 12 depicts a schematic view of a portion of the downhole tool of FIG. 3, and a force diagram illustrating the operation of one of the arm systems.

FIG. 12 depicts a schematic view of the operation of one of the arm systems 110 of FIG. 2A. The actuator 116, as shown, actuates the arm actuation portion 208. As the actuator 116 applies an actuation force $F_a$ to the actuation arm actuation end 304, the arm actuation portion 208 pivots about the actuation arm pivot end 306. The pivoting of the arm actuation portion 208 may cause the first arm 200 to pivot toward the closed position. The biasing members 118 may apply a biasing force $F_s$ to the first arm 200, the second arm 202, and/or the pad 108 as the actuator 116 moves the arm system 110 toward the closed position.

The biasing force $F_s$ may bias the arm system 110 against the actuation force $F_a$. When the actuation force $F_a$ is released, the biasing force $F_s$ may move the pad 108 into engagement with wellbore wall 112. As such, the pad 108 of the arm system 110 may engage the wellbore wall 112 in response to the biasing spring force $F_s$. When the arm system 110 engages the upset 400, as shown in FIG. 12 in a dashed line, the sliding shuffle 204 coupled to the second arm 202 may translate along the tool body 220. As the sliding shuffle 204 translates, the swivel bearings 206 may allow the pad 108 to rotate at an axial tilt and maintain engagement with the wellbore wall 112. The rotating swivel bearings 206 may allow the second arm 202 and the first arm 200 to move as the second arm 202 moves with the sliding shuffle 204. As the arm system 110 adjusts with respect to undulations of the wellbore wall 112, the biasing members 118 may exert a substantially equal force on, for example, the first arm 200 and the second arm 202 of the arm system 110, or directly on the pad 108, thereby exerting a substantially even force distributed across the pad 108. The substantially even force distributed across the pad 108 may assist the arm system 110 in maintaining the pad 108 in contact with the wellbore wall 112, thereby permitting higher resolution measurements of the subterranean formation 107. Moreover, the actuator 116 may be used to force the pad 108 into further engagement with the wellbore wall 112 thereby maintaining the pad 108 in the engaged position with sufficient contact pressure between the pad 108 and the wellbore wall 112.

Figure 13:
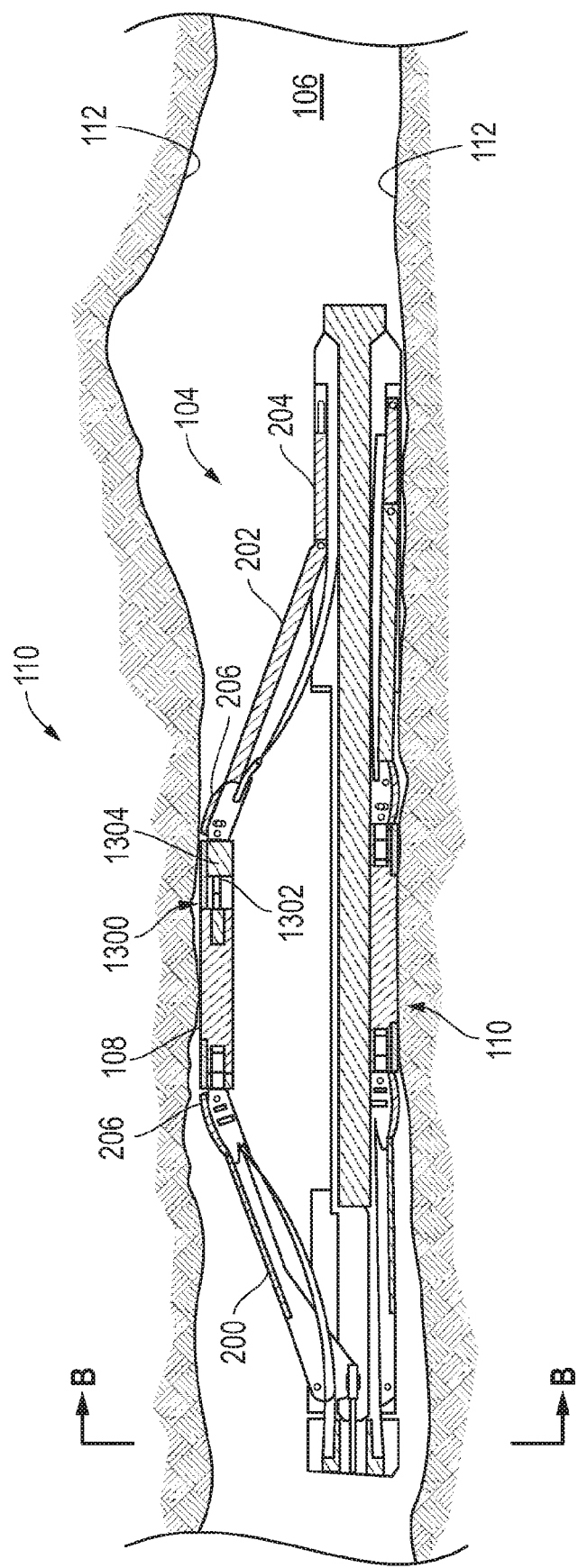
FIG. 13 depicts a cross-sectional view of an embodiment of the downhole tool of FIG. 3 having a pad sliding linkage.

FIG. 13 is a cross-sectional view of an embodiment of the downhole tool 104 of FIG. 3. The arm systems 110, as shown, may have a pad sliding linkage 1300 in addition, or as an alternative to, the sliding shuffle 204. The pad sliding linkage 1300 may have a pad pin 1304 configured to longitudinally travel along the pad central axis 213 within a pad guide slot 1302. As the pad pin 1304 travels within the pad guide slot 1302, the distance between the swivel bearings 206 and the pad 108 and/or the arms 200/202 may lengthen and shorten. The pad sliding linkage 1300 may be used on one or both ends of the pad 108. Although, the pad sliding linkage 1300 is shown as the pad pin 1304 in the pad guide slot 1302, any suitable device for allowing the pad 108 and/or the arms 200/202 to longitudinally translate relative to the swivel bearing 206 may be used, for example, a recess, or the longitudinal limit stop 770, (as shown in FIG. 7D) on the rotary pin 714 may engage a translation limit stop, and the like.

Figure 14:
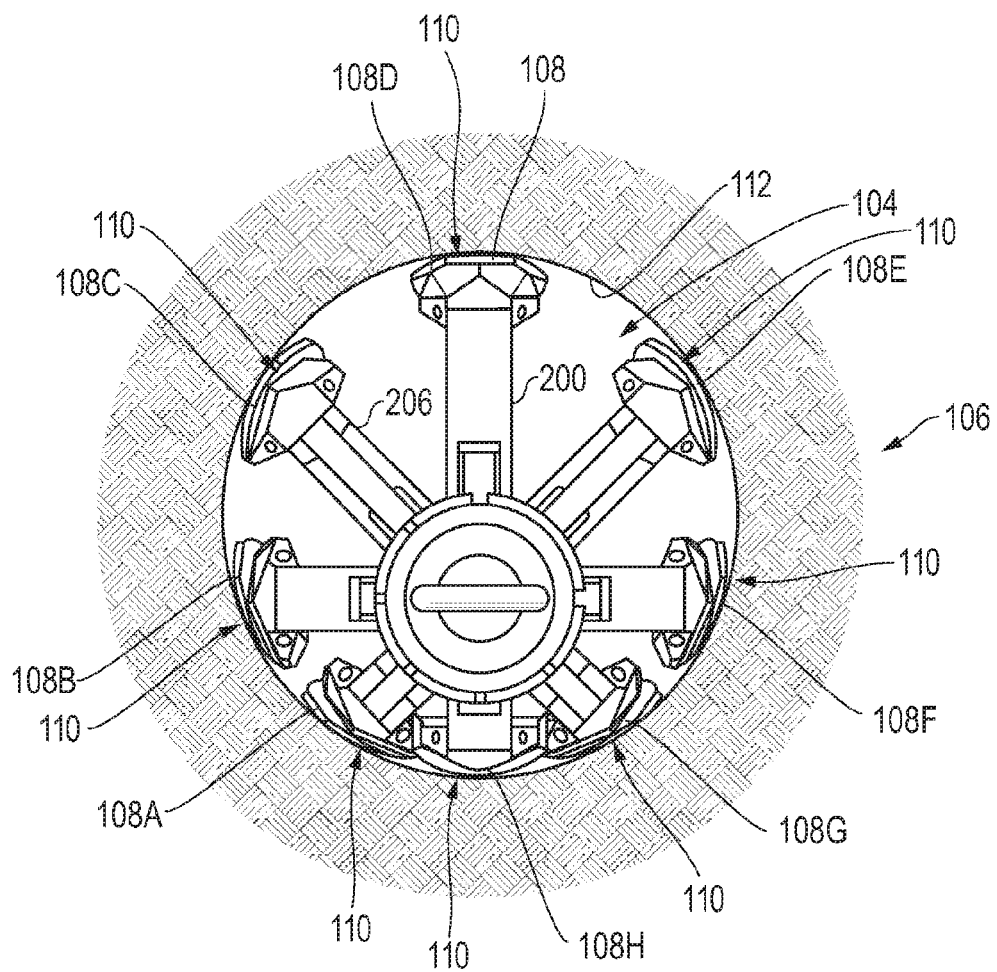
FIG. 14 depicts a schematic end view of the downhole tool constructed in accordance with an embodiment of the present disclosure.

FIG. 14 shows a schematic end view of an embodiment of the downhole tool 104 of FIG. 3. As described in detail hereinbefore, each of the pads 108 are preferably configured to tangentially tilt relative to the pad central axis 213 (as shown in FIG. 2A) and axially tilt at an angle relative a downhole tool central axis 212 (as shown in FIG. 2A) in an independent manner so as to permit each of the pads 108 to engage the wellbore wall 112 even in locations where the wellbore wall 112 is not uniformly round or where the downhole tool 104 is eccentrically located in the wellbore 106. The swivel bearings 206 may allow the pads 108 to tangentially tilt independent of the other pads 108, or the arms 200/202, in order to maintain engagement with the wellbore wall 112, as shown by the pads 108A-C and 108 E-G, while pads 108D and 108H remain substantially straight due to the disposition of the arms 200/202 relative to the geometry of the wellbore wall 112.

Figure 15:
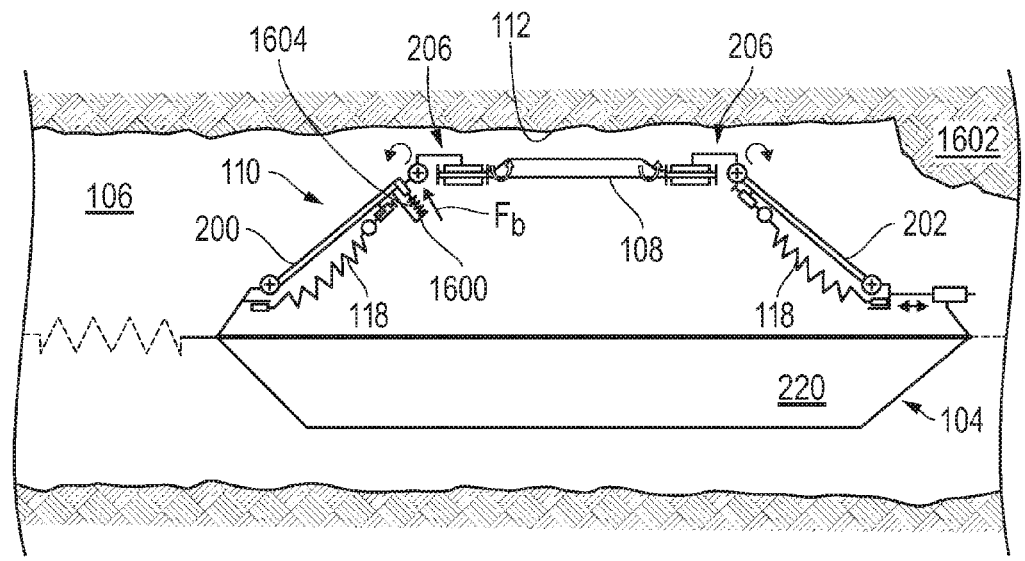
FIG. 15 depicts a kinematic diagram of the downhole tool constructed in accordance with an embodiment of the disclosure herein, illustrating the operation of one of the arms having an anti-locking device.

FIG. 15 depicts a kinematic diagram of an embodiment of the downhole tool 104 illustrating the arm system 110 having the anti-locking device 1600. As the downhole tool 104 with the double arm configuration of the arm system 110 travels within the wellbore 106, the arm system 110 may become jammed, or locked, if the downhole tool 104 runs into a sharp upset 1602 or restriction. The sharp upset 1602 may be caused by a naturally occurring upset in the wellbore wall 112, and/or by restrictions placed in the wellbore 106, such as a casing entry, tubing entry, sidetrack entry, and the like.

When the leading arm, in this case the second arm 202, encounters the sharp upset 1602, the arm system 110 of the downhole tool 104 either closes itself, or the arm system 110 may enter a blockage situation wherein a static force equilibrium is created throughout the arm system 110. The blockage situation may lock the arm system 110 thereby preventing the downhole tool 104 from passing the sharp upset 1602. The anti-locking device 1600 may be configured to release the arm system 110 when the blockage situation occurs by modifying the force equilibrium in the arm system 110, and by moving at least one of the arms 200/202 relative to the tool body 220. As shown in FIG. 15, the anti-locking device 1600 is coupled to the first arm 200. However, the anti-locking device 1600 may be coupled to the second arm 202, the pad 108, and/or both the second arm 202 and the first arm 200.

The anti-locking device 1600 preferably includes an anti-lock bias 1604. The anti-lock bias 1604 of the anti-locking device 1600 may be configured to create a biasing force $F_b$ on a portion of the arm system 110, as will be described in more detail hereinafter. Therefore, when outside forces are not applied by the wellbore wall 112 (or the sharp upset 1602), the biasing force $F_b$ from the antilock bias 1604 maintains the arm system 110 in an engaged position.

Figure 16A:
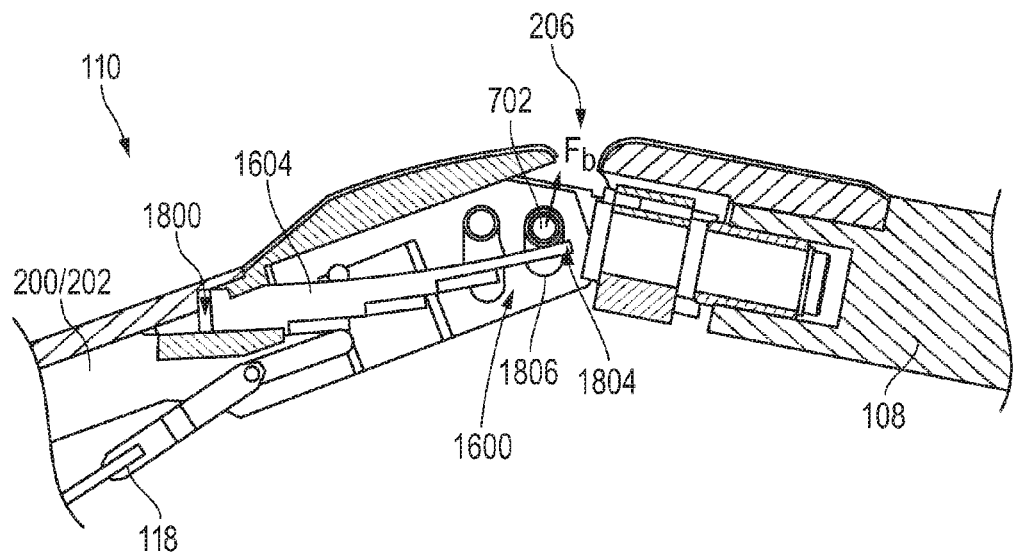
FIGS. 16A and 16B depict partial cross-sectional side views of the swivel bearing of FIG. 15 with the anti-locking device moving between a released and an engaged position.
Figure 16B:
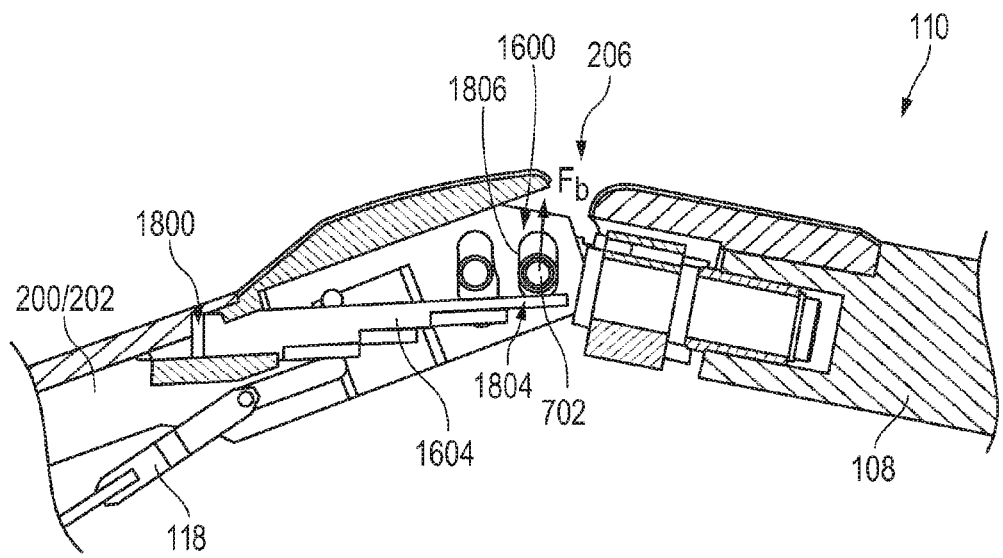

FIGS. 16A and 16B depict schematic side views of an embodiment of the arm system 110 having the anti-locking device 1600 of FIG. 15 shown in an engaged position and a biased position, respectively. In the engaged position, the downhole tool 104 operates as normal, logging the wellbore 106 as described herein. In the biased position, the biasing force $F_b$ has been overcome due to, for example, entering a blockage situation, and a portion of the arm system 110 is linearly shifted toward the tool body 220. Such linear shift of the arm system 110, whether a few millimeters, a few tens of millimeters, a few centimeters, or a few tens of centimeters, preferably allows the downhole tool 104 to move past the blockage situation, and the anti-locking device 1600 may preferably return to the engaged position.

The anti-locking device 1600 is shown to include the anti-lock bias 1604, and an anti-lock slot 1806 in which the pivot pin 702 may be configured to travel to the limits of a predetermined linear shift. The anti-lock bias 1604, or a deflection member, is shown as a leaf spring fixed to the arm 200/202 at a fixed end 1800 and the pivot pin 702 at a free end 1804. As described previously, with reference to FIGS. 7A-7D, the pivot pin 702 of the swivel bearing 206 is preferably configured to allow an axial pivot between the swivel bearing 206 and the arm 200/202. As the force increases in the arm system 110 to overcome the biasing force $F_b$, the pivot pin 702 may travel in the anti-lock slot 1806 from the engaged position shown in FIG. 16A to the biased position shown in FIG. 16B. Although the anti-lock bias 1604 is shown as a leaf spring, it may be any suitable biasing member, such as a coiled spring and the like. Although not shown, it should be appreciated that the anti-lock bias 1604 and the anti-lock slot 1806 may be coupled to the pad 108, the swivel bearing 206, and/or the tool body 220. Likewise, the pivot pin 702 may be coupled to the arm 200/202 and/or the tool body 220.

FIGS. 17A and 17B depict schematic views of the downhole tool 104 of FIG. 15 having the anti-locking device 1600 in the engaged position and the biased position, respectively, deployed in a wellbore 106. FIG. 17A shows the second arm 202 of one of the arm systems 110 engaging the sharp upset 1602 prior to the biasing force $F_b$ of the anti-locking device 1600 being overcome. The force may increase in the arm system 110 until the biasing force $F_b$ is overcome, thereby moving the anti-locking device 1600 to the biased position, as shown in FIG. 17B. The arm system 110 of the downhole tool 104 may then be allowed to move toward the closed position in order to allow the downhole tool 104 to pass the sharp upset 1602.

Figure 18:
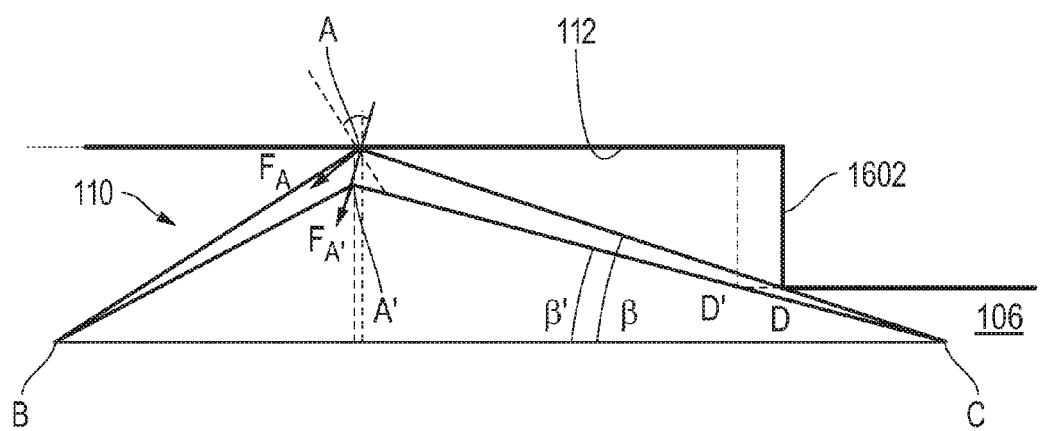
FIG. 18 depicts a schematic force diagram of the anti-locking device operation on one of the arm systems of FIG. 15.

FIG. 18 depicts a schematic illustration representing the anti-locking device 1600 (as shown in FIG. 15) overcoming the biasing force $F_b$ in the arm system 110 when the sharp upset 1602 is encountered, similar to the position of the downhole tool 104 in FIGS. 4 and 17B. When the sharp upset 1602 is encountered at point D, the arm system 110 may have a configuration similar to the triangle ABC. The triangle ABC may be representative of the arm system 110, where A may be representative of the pivot pin 702, and B and C may be representative of the pivot connection 219. As the blockage situation (or the sharp upset 1602) is encountered, the biasing force $F_b$ created by the anti-lock bias 1604 is overcome by the continued pulling/pushing of the downhole tool 104 within the wellbore 106 against the sharp upset 1602. When the biasing force $F_b$ is overcome, the anti-locking device 1600 allows a restricted portion of the arm system 110 to linearly shift its shape to a biased position similar to the triangle A'BC and adjust to point D'. The restricted portion may be defined in relation to this Figure as between A and C, or A' and C. The movement from A to A' may cause a reduction in the angle β created between the restricted portion [A-C] and the tool body [B-C] to a new angle β'. This small reconfiguration of the shape of the arm system 110 may release the force in the arm system 110, thereby allowing the arm system 110 to move toward the closed position. The force reduction created by the anti-locking device 1600 may reduce the overall force by, for example, around 65%.

Figure 19:
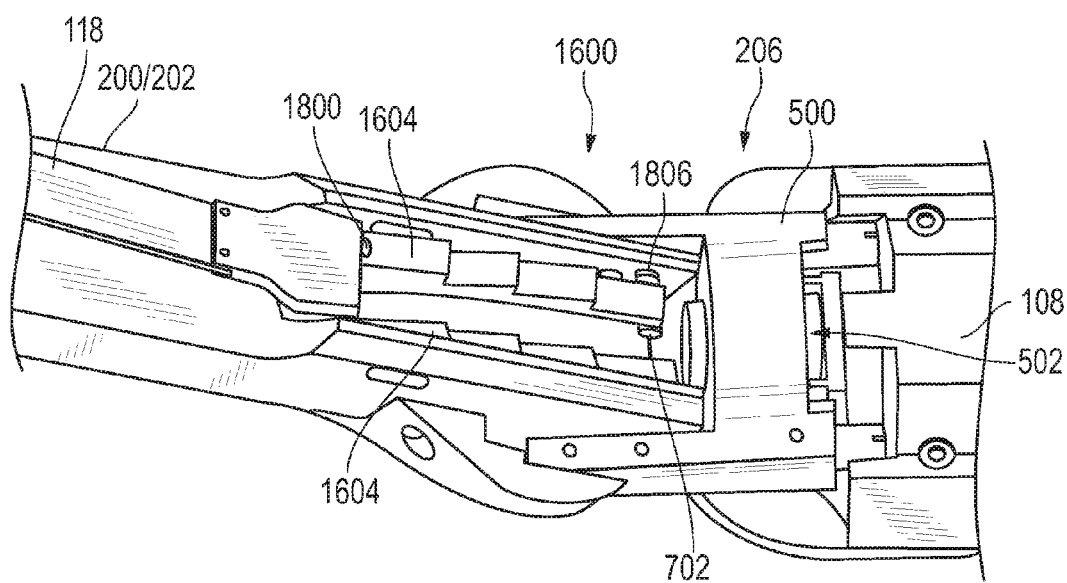
FIG. 19 depicts a schematic perspective view of the anti-locking device of FIG. 15.

FIG. 19 depicts a schematic bottom perspective view of a portion of the arm system 110 having the anti-locking device 1600 of FIGS. 6 and 15. The anti-locking device 1600, as shown, includes the anti-lock bias 1604, which engages the pivot pin 702. The pivot pin 702 may couple to the fork 500. As shown, the pivot pin 702 extends through the slot 1806 of the arm 200/202 to engage the anti-lock bias 1604. The anti-locking device 1600 may include two anti-lock biases 1604, as shown, or may include any number of anti-lock biases 1604 so as to create the biasing force $F_b$ on a portion of the arm system 110. Moreover, the pivot pin 702 may extend across the fork 500, or any other suitable configuration of the swivel bearing 206.

FIGS. 20-23 show schematic views of an embodiment of the downhole tool 104 having multiple arm sets, for example a first arm set 2100 and a second arm set 2102, or interleaved arm sets 2100 and 2102. Each of the arm sets 2100/2102 may have multiple arm systems 110 as described herein. The arm sets 2100 and 2102 are shown as overlapping one another in an interleaved architecture wherein the first arm set 2100 ends after the second arm set 2102 begins. Where the arm sets 2100/2102 are spaced sequentially along the tool body 220 and do not overlap one another, there may be a significant distance between the end of the first arm set 2100 and the beginning of the second arm set 2102. In some cases, the space between the sequential arms sets 2100/2102 may reduce the quality of the data collected by the pads 108 due to an error caused by rotating, or twisting, the tool in the wellbore 106 as the downhole tool 104 is being conveyed. For example, where multiple arm sets 2100/2102 are used to image a formation surrounding the wellbore 106, the configuration of the multiple arms 2100/2102 may be displaced to provide a maximum coverage of the circumferential surface of the wellbore environment. A twisting of the downhole tool 104 in the wellbore 106 may overlap the range of measurements, and thereby reduce the coverage.

The interleaved architecture of FIGS. 20-23 allows the first arm set 2100 to partially overlap the second arm set 2102. Therefore, the interleaved architecture allows the pads 108 of the first arm set 2100 and the second arm set 2102 to be located closer together than the sequential arm sets. The arm systems 110 used for the interleaved architecture may be any of the arm systems 110 described herein.

Figure 20:
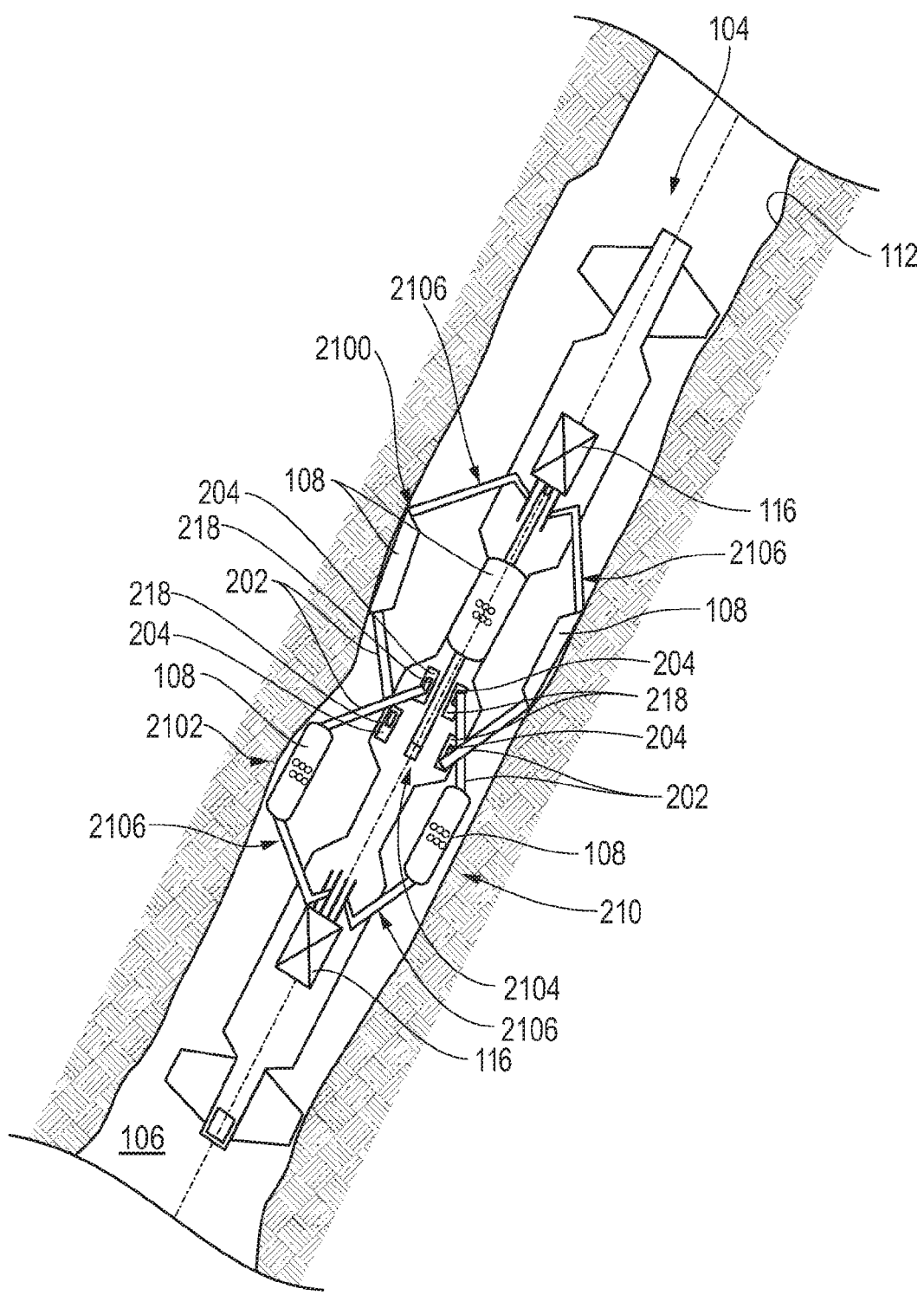
FIG. 20 depicts a schematic view of the downhole tool in the wellbore of FIG. 1 having a plurality of interleaving arm sets.

FIG. 20 shows the interleaved arm sets 2100/2102 having the second arms 202 overlapping one another at an overlap tool body portion 2104. The overlap tool body portion 2104 may be configured to secure the overlapped arms, as shown on the second arms 202, to the tool body 220. The overlap tool body portion 2104 may have any structures, apparatus and/or devices suitable for coupling the arms 200/202 to the tool body 220. The overlap tool body portion 2104 may have the slots 218 to allow the sliding shuffle 204 coupled to the second arms 202 to translate as previously described herein. Therefore, each of the arm systems 110 may be configured to have their respective arm tool end 216 (as shown in FIG. 2A) coupled to the sliding shuffle 204 located in the overlap tool body portion 2104 of the downhole tool 104.

This configuration may allow a plurality of leading arms 2106 of the downhole tool 104 to be pivotally fixed to the tool body 220 while a plurality of interleaved arms 2108 translate relative to the tool body 220 in the overlap tool body portion 2104. The leading arm(s) 2106 may be the first arms to engage the wellbore upsets as the downhole tool 104 travels within the wellbore 106. For example, the leading arm(s) 2106 of the first arm set 2100 may be the first of the arms 200/202 to engage the wellbore wall 112 when the downhole tool 104 is travelling and logging up the wellbore 106, while the leading arm(s) 2106 of the second arm set 2102 may be the first of the arms 200/202 to engage the wellbore wall 112 when the downhole tool 104 is travelling and logging down the wellbore 106. The overlap tool body portion 2104 may further secure the arm systems 110 to the tool body 220 with any of the configurations described herein. For example the first arm set 2100 may have the pivot connection 219 at the overlap tool body portion 2104 while the second arm set 2102 has the translating connection, for example with a sliding shuffle 204, at the overlap tool body portion 2104. However each of the arms systems 110 within the arm sets 2100 and 2102 may have varying connection types at the overlap tool body portion 2104. Although, the leading arms 2106 are shown as being pivotally coupled to the tool body 220 while the interleaved arms 2108 are shown coupled to the sliding shuffle 204 any combination of arm connections may be used, such as the leading arms 2106 and the interleaved arms 2108 coupling to the sliding shuffle 204, the leading arms 2106 coupled to the sliding shuffle 204 while the interleaved arms 2108 have a pivot connection and any combination thereof.

Figure 21:
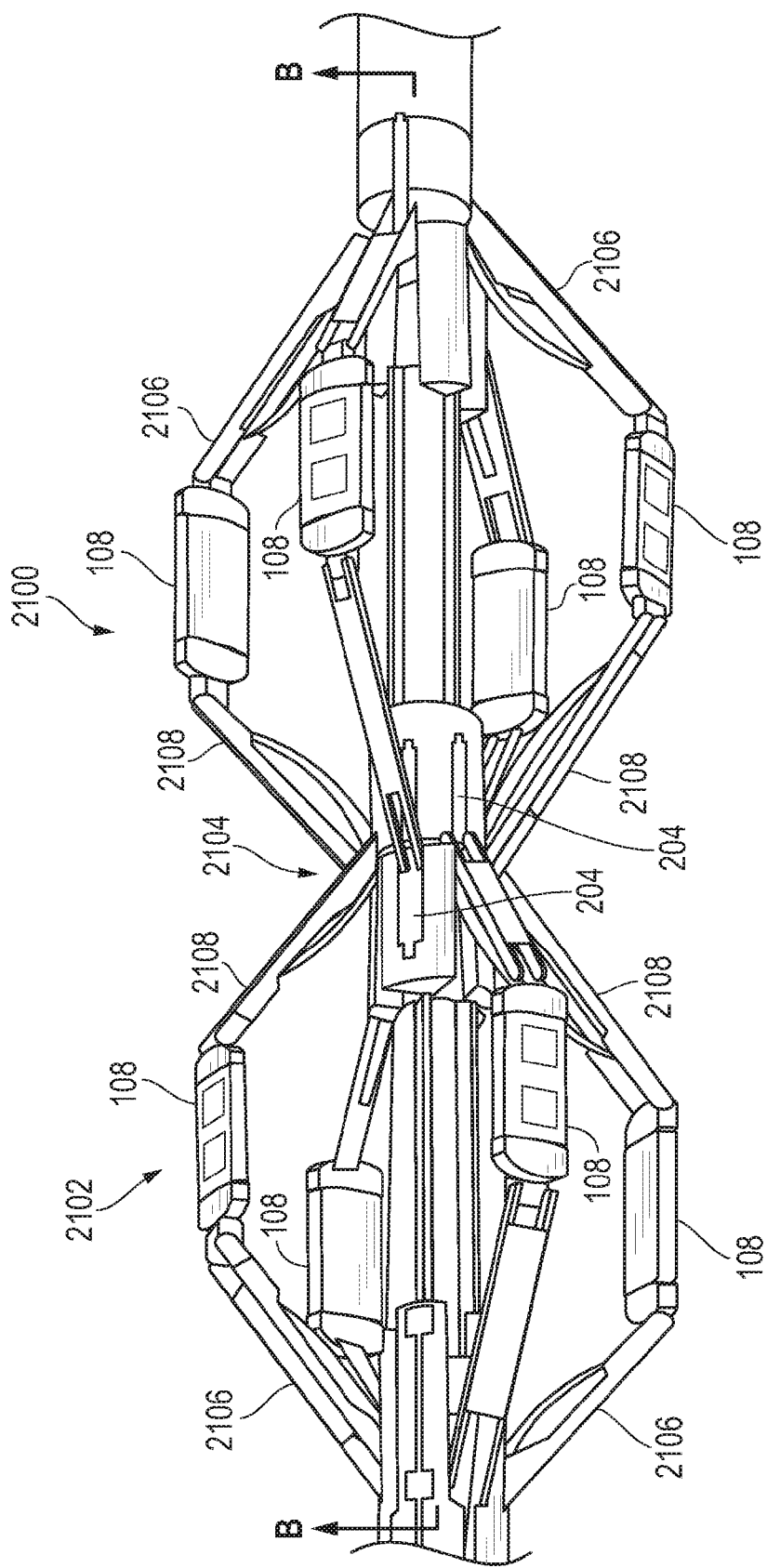
FIG. 21 depicts an alternate schematic view of the downhole tool of FIG. 20.

As shown in FIG. 21, each of the interleaved arm sets 2100 and 2102 may have four arm systems 110 positioned radially about the tool body 220. As shown, the interleaved arm sets 2100 and 2102 may be offset at approximately 45° to one another. In the configuration shown, there may be four pads 108 on the first arm set 2100 spaced 90° from one another, and another four pads 108 on the second arm set 2102 also spaced 90° from one another, and 45° from the four pads 108 on the first arm set 2100. This configuration may allow for logging a larger circumferential portion of the wellbore 106. Although, the downhole tool 104 is described as having eight pads 108 spaced between the interleaved arm sets 2100 and 2102, there may be any number of arm systems 110 on each of the arm sets 2100 and 2102 having varying degrees of spacing between the arm systems 110 and/or the arm sets 2100 and 2102.

Figure 22:
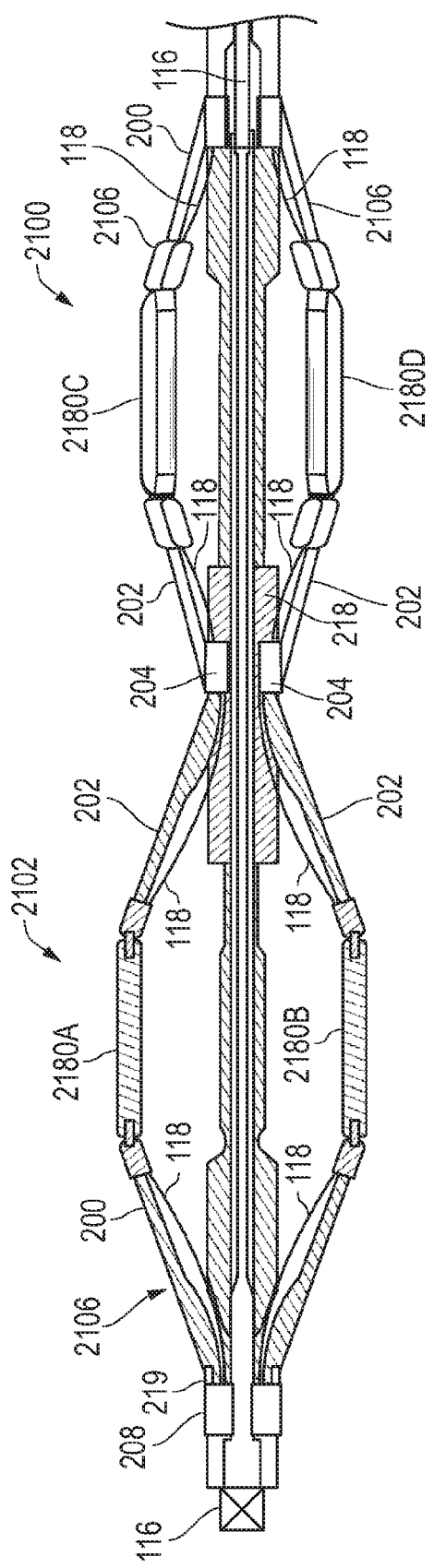
FIG. 22 depicts a partial cross-sectional view of the downhole tool of FIG. 21 cut along line B-B.

FIG. 22 depicts a cross-sectional view of the downhole tool 104 of FIG. 21 taken along line B-B. The downhole tool 104 may have similar pads 108, as shown in FIG. 21, or may have a plurality of varying pads 2180A-D, as shown in FIG. 22. For example, a first pad 2180A may be configured to measure fluid parameters in the wellbore 106 while a second pad 2108B may be configured to measure formation parameters. Any combination of wellbore 106 and/or formation parameters may be measured by the pads 2180A-D. The combined signal sensed by the first arm set 2100 and the second arm set 2102 may be combined to provide virtually complete 360° coverage, or logging, of the wellbore environment. Since this apparatus is operable both upon ingress and egress of the wellbore 106, confirmatory signals, or readings, may be collected and compared to more accurately measure the wellbore 106 characteristics sought. Therefore, at least one measured parameter taken while logging in a first direction may be compared to at least one measured parameter taken while logging a second direction. By interleaving the first arm set 2100 and the second arm set 2102 in the overlap tool body portion 2104, or the mid-body portion, the mid-point of each of the arm sets 2100, 2102 may be moved closer along the longitudinal axis of the tool body 220. This configuration is designed to enable the pad 108 coverage of the wellbore wall 112 to permit higher resolution signal generation for logging the wellbore, and to decrease the probability of overlapping signals from rotation of the entire tool body as the downhole tool 104 is transported through the wellbore 106.

FIG. 22 shows the arm systems 110 of the arm sets 2100 and 2102 having a similar structure as the arm systems 110, described above. The arm systems 110 may have the sliding shuffle 204 configured to translate in the slot 218. The first arms 200, as shown, are the leading arms 2106 of the arm sets 2100 and 2102. The first arms 200 may be coupled to the tool body with the pivot connections 219. The actuators 116 and the biasing members 118 may operate in a similar manner, as described above, in order to move the pads 108/2180 between the engaged position and the closed position.

Figure 23:
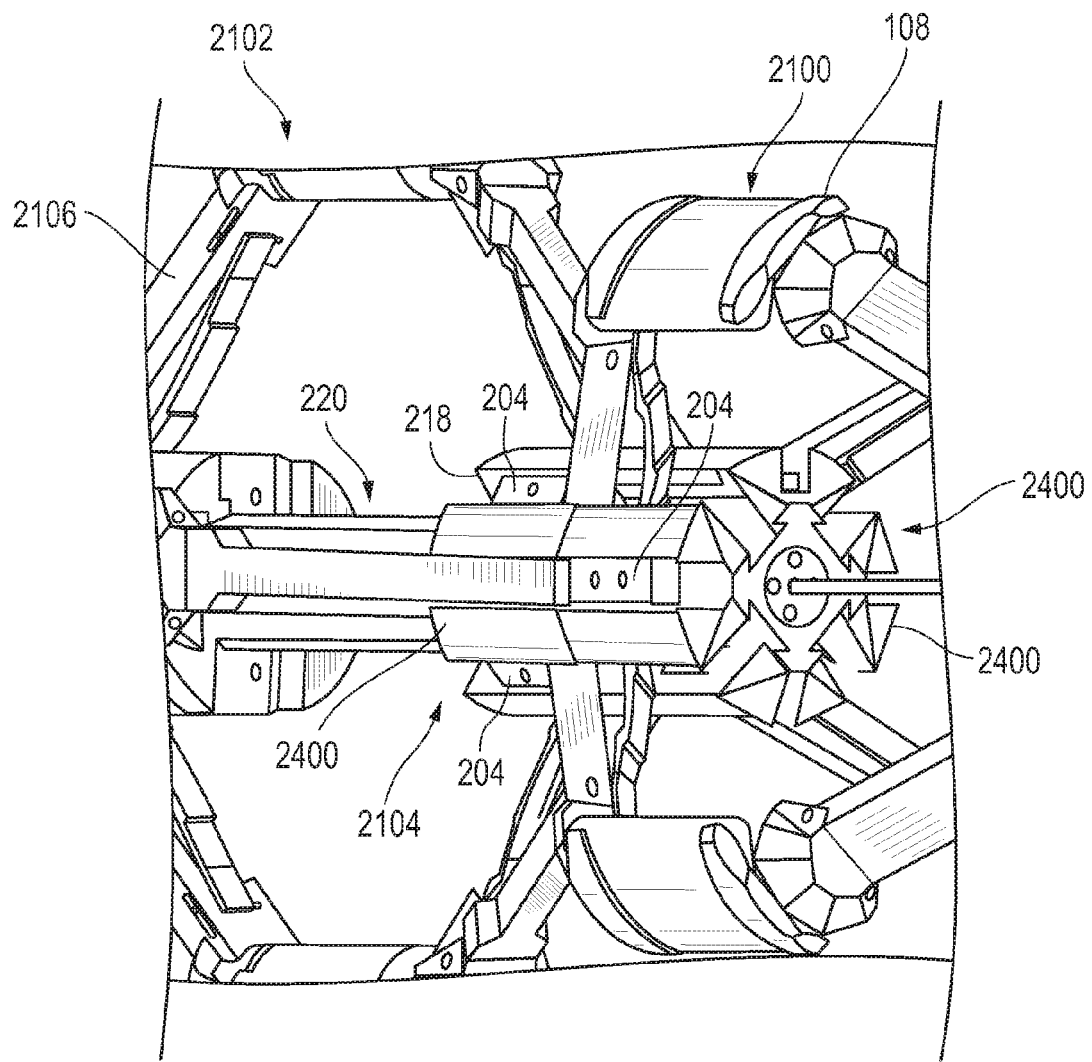
FIG. 23 depicts a schematic perspective view of a portion of the downhole tool of FIG. 21.

FIG. 23 depicts a perspective view of a portion of the downhole tool of FIG. 22. The overlap tool body portion 2104 may have a plurality of ribs 2400 around the circumference of the tool body 220. The ribs 2400 may form at least a portion of the slots 218 for the sliding shuffles 204 to translate within.

The arm systems 110 of each of the arm sets 2100 and 2102 may have the anti-lock device 1600 (as shown in FIG. 15) in order to prevent the downhole tool 104 from becoming stuck in the wellbore 106.

The pads, as described herein, are preferably positionable against the wellbore wall for taking measurements thereof. The pads may be conventional sensors or sensing systems operable for downhole use. Electrodes or other sensors may be used in the pads for taking desired downhole measurements. Sensors may also be positioned at other locations about the wellbore and/or tool to take additional downhole measurements.

As described above there may be any suitable number of arms systems 110 in each of the arm sets 210, 2100 and/or 2102 on the downhole tool 104. The number of arm systems 110 may range from 1 arm system 110 up to 100, or more, arm systems 110 per arm set 210, 2100 and/or 2102. The angle between the arm systems 110 in each arm set 210, 2100 and/or 2102 may vary depending on the number of arm systems 110 within each arm set 210, 2100 and/or 2102. Further, the angle between the arm sets 210, 2100 and/or 2102 may vary depending on the number of arm sets 210 on the downhole tool 104 and the number of arm systems 110 within each of the arm sets 210, 2100 and/or 2102. Table 1 depicts an example of several different arrangements of the arm systems 110 and arm sets 210, 2100 and/or 2102 on the downhole tool 104. The first column depicts the number of arm systems 110 in each of the arm sets 210, 2100 and/or 2102 of the downhole tool 104. The second column depicts the angle that may be between the arm systems 110 within each of arm sets 210, 2100 and/or 2102. The third column depicts the number of arm sets 210, 2100 and/or 2102 on the downhole tool 104. The fourth column depicts the azimuth angle that may be between the arm systems 110 of the different arm sets 210, 2100 and/or 2102 of the downhole tool.

TABLE 1

| No. of arm systems per arm set | Angle between the arm systems within the arm sets | No. of arm sets | Angle between the arm sets |
|---|---|---|---|
| 1 | 360° | 2 | 180° |
|  |  | 3 | 120° |
|  |  | 4 | 90° |
| 2 | 180° | 2 | 90° |
|  |  | 3 | 60° |
|  |  | 4 | 45° |
| 3 | 120° | 2 | 60° |
|  |  | 3 | 40° |
| 4 | 90° | 2 | 45° |
|  |  | 3 | 30° |
| 6 | 60° | 2 | 30° |

The angles between the arm systems 110 in each of the arm sets 210, 2100 and/or 2102 may be determined using the following equation:

$$\text{Arm System Angle} = 360°/(\text{number of arm systems in arm set}) \quad \text{(Equation 1)}$$

The azimuth angle between the arm systems 110 of different arm sets 210, 2100 and/or 2102 may be determined using the following equation:

$$\text{Azimuth Angle} = (\text{Arm system angle})/(\text{Number of Arm Sets}) \quad \text{(Equation 2)}$$

Figure 24:
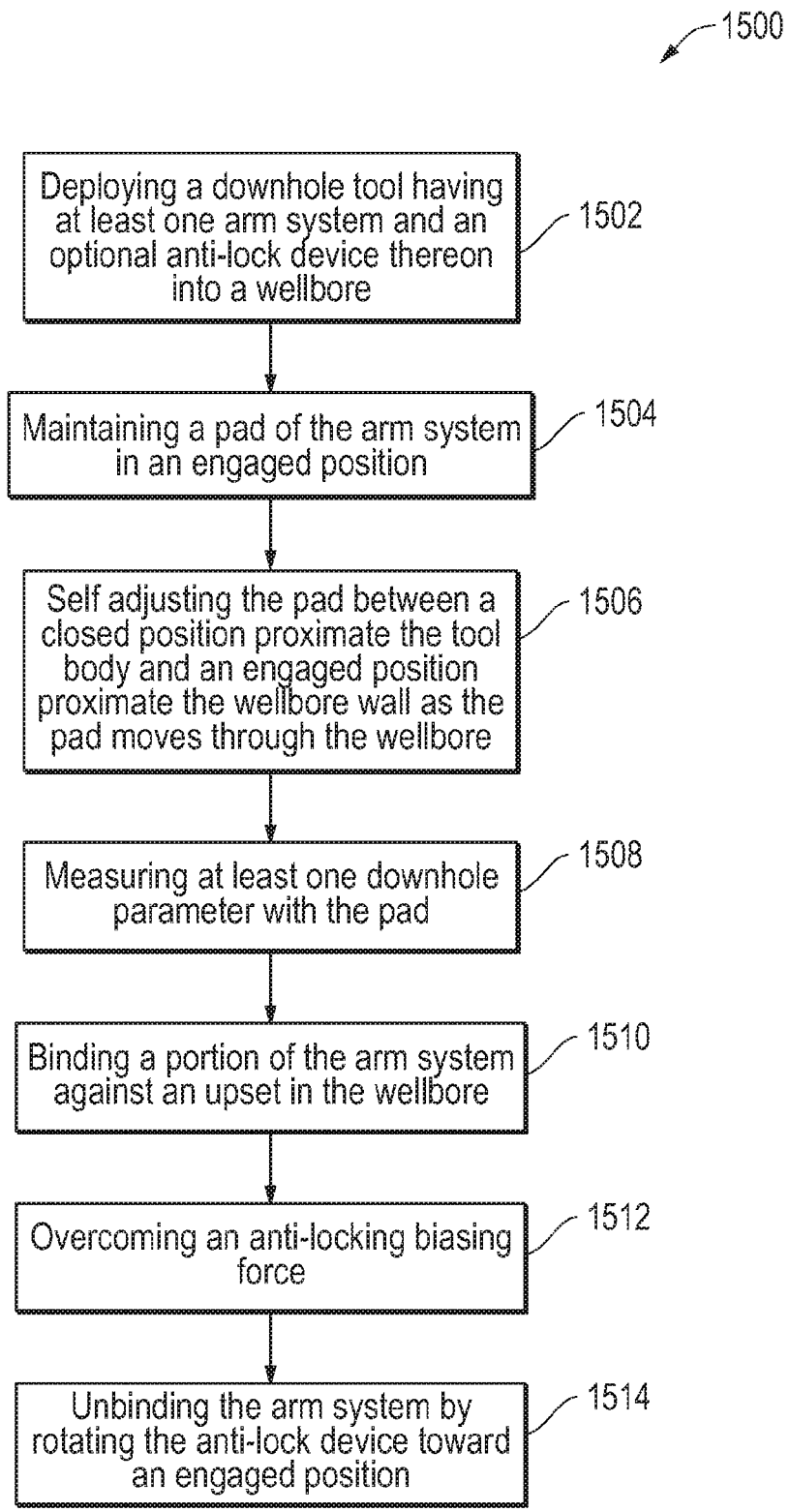
FIG. 24 depicts a method for logging the wellbore.

FIG. 24 depicts a flowchart 1500 depicting a method of logging a wellbore. The flowchart begins by deploying 1502 the downhole tool having at least one the arm system and an optional anti-lock device thereon into a wellbore. The downhole tool may be any downhole tool described herein. The flowchart continues by maintaining 1504 a pad of the arm system in an engaged position. The flowchart continues by self-adjusting 1506 the pad between a closed position proximate the tool body and an engaged position proximate the wellbore wall as the pad moves through the wellbore, and measuring 1508 at least one downhole parameter with the pad. Optionally, the flowchart continues by binding 1510 a portion of the arm system against an upset in the wellbore and overcoming 1512 an anti-lock biasing force. The flowchart continues by unbinding 1514 the arm system by rotating the anti-lock device toward an engaged position.

It should be understood that the components of the invention set forth above, and claimed below, can be provided as unitary elements, or multiple elements which are connected and/or otherwise adapted to function together, unless specifically limited to a unitary structure in the claims.

While the embodiments are described with reference to various implementations and exploitations, it will be understood that these embodiments are illustrative and that the scope of the inventive subject matter is not limited to them. Many variations, modifications, additions and improvements are possible. For example, the techniques used herein may be applied to log multiple wellbores.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A logging tool having at least two arm sets for logging a wellbore having a wellbore wall and at least one subterranean formation thereabout, the two arm sets positionable on a downhole tool deployable into the wellbore, the at least two arm sets comprising:

a first arm set having at least two azimuthally spaced first arm systems with a sensor pad coupled to two arms, the two arms having an upper connection and a lower connection on a tool body of the downhole tool;

a second arm set having at least two azimuthally spaced second arm systems with a sensor pad coupled to two arms, the two arms having an upper connection and a lower connection on the tool body and wherein the upper connection of said second arm set are longitudinally overlapped between the lower connections of the first arm set; and an overlap tool body portion for coupling the upper connection of the second arm set and the lower connections of the first arm set to the downhole tool.

2. The logging tool of claim 1, wherein the at least two arm sets further comprise at least one sliding shuffle coupled to the overlap tool body portion and adapted to allow at least one of the arm sets to translate along a longitudinal axis of the tool body proximate the overlap tool body portion.

3. The logging tool of claim 1, wherein the first arm set and the second arm set further comprise four arm systems azimuthally spaced 90° apart around a radius of the downhole tool.

4. The logging tool of claim 3, wherein the first arm set is oriented rotationally 45° from the second arm set thereby having the overlapped arms of each of the first arm set and the second arm set spaced at 45° apart.

5. The logging tool of claim 2, wherein the overlap tool body portion further comprises at least one slot for each of the sliding shuffles, the slot for allowing the sliding shuffle to translate within the tool body.

6. The logging tool of claim 5, wherein the at least one sliding shuffle further comprises one sliding shuffle for each of the first arm systems.

7. The logging tool of claim 6, further comprises a second sliding shuffle coupled to each of the first arm systems at the upper connection to the tool body.

8. The logging tool of claim 5, wherein the at least one sliding shuffle further comprises one sliding shuffle for each of the second arm systems.

9. The logging tool of claim 6, further comprising a second sliding shuffle coupled to each of the second arm systems at the lower connection to the tool body.

10. A system for logging a wellbore having a wellbore wall and at least one subterranean formation thereabout, the system comprising:

a downhole tool having two arm sets deployable into the wellbore, the two arm sets comprising:

a first arm set having at least two azimuthally spaced first arm systems with a sensor pad coupled to two arms, the two arms having an upper connection and a lower connection on a tool body of the downhole tool;

a second arm set having at least two azimuthally spaced second arm systems with a sensor pad coupled to two arms, the two arms having an upper connection and a lower connection on the tool body and wherein the upper connection of said second arm set are longitudinally overlapped between the lower connections of the first arm set;

an overlap tool body portion for coupling the upper connection of the second arm set and the lower connections of the first arm set to the downhole tool; and at least one sliding shuffle coupled to the overlap tool body portion and adapted to allow at least one of the arm sets to translate along a longitudinal axis of the tool body.

11. The system of claim 10, further comprising a biasing member for biasing the pad.

12. The system of claim 10, wherein the biasing member biases the pad toward an engaged position with the wellbore.

13. The system of claim 10, further comprising a swivel bearing coupling at least one of the two arms of the first arm system to the pad.

14. The system of claim 13, further comprising an anti-lock device coupled to the swivel bearing, the anti-lock device having an anti-lock biasing member for maintaining a connection between the at least one of the two arms and the pad at the swivel bearing in a resting position during normal logging and for allowing the connection to rotate toward an engaged position when a binding force is encountered in the arm system.

15. A method for logging a wellbore having a wellbore wall and at least one subterranean formation thereabout, the method comprising the steps of:

deploying a downhole tool into the wellbore, the downhole tool having two arm sets thereon, the two arm sets comprising:

a first arm set having at least two azimuthally spaced first arm systems with a sensor pad coupled to two arms, the two arms having an upper connection and a lower connection on a tool body of the downhole tool;

a second arm set having at least two azimuthally spaced second arm systems with a sensor pad coupled to two arms, the two arms having an upper connection and a lower connection on the tool body and wherein the upper connection of said second arm set are longitudinally overlapped between the lower connections of the first arm set;

an overlap tool body portion for coupling the upper connection of the second arm set and the lower connections of the first arm set to the downhole tool; and at least one sliding shuffle coupled to the overlap tool body portion and adapted to allow at least one of the arm sets to translate along a longitudinal axis of the tool body proximate the overlap tool body portion;

maintaining each of the pads in an engaged position against the wellbore wall by self-adjusting the pad between a closed position proximate the tool body and the engaged position proximate the wellbore wall as the pad moves through the wellbore; and measuring at least one downhole parameter with the pad.

16. The method of claim 15, further comprising moving the downhole tool in a first longitudinal direction in the wellbore while logging the wellbore.

17. The method of claim 16, further comprising moving the downhole tool in a second longitudinal direction while logging the wellbore.

* * * * *